United States Patent
Jung et al.

(10) Patent No.: US 11,553,178 B2
(45) Date of Patent: Jan. 10, 2023

(54) METHOD AND ELECTRONIC DEVICE FOR ANALYZING IMAGE

(71) Applicant: Samsung Electronics Co., Ltd., Suwon-si (KR)

(72) Inventors: Jaeil Jung, Suwon-si (KR); Junik Jang, Suwon-si (KR); Jonghee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 17/026,020

(22) Filed: Sep. 18, 2020

(65) Prior Publication Data

US 2021/0092369 A1 Mar. 25, 2021

(30) Foreign Application Priority Data

Sep. 19, 2019 (KR) .................. 10-2019-0115481

(51) Int. Cl.
*H04N 19/176* (2014.01)
*H04N 19/117* (2014.01)
*H04N 19/182* (2014.01)
*G06T 9/00* (2006.01)

(52) U.S. Cl.
CPC ............ *H04N 19/117* (2014.11); *G06T 9/002* (2013.01); *H04N 19/176* (2014.11); *H04N 19/182* (2014.11)

(58) Field of Classification Search
CPC .. H04N 19/117; H04N 19/176; H04N 19/182; G06T 9/002
USPC .................................................... 375/240.29
See application file for complete search history.

(56) References Cited

U.S. PATENT DOCUMENTS

2018/0189597 A1 7/2018 Johri et al.
2018/0349735 A1 12/2018 Lin et al.
2018/0365089 A1 12/2018 Okanohara et al.

OTHER PUBLICATIONS

Amazon Web Services, Inc., "A Platform for Computing at the Mobile Edge: Joint Solution with HPE, Saguna, and AWS", Feb. 2018, 29 pages.
Hoffer et al., "Deep Metric Learning Using Triplet Network", Accepted as a workshop contribution at ICLR 2015, Dec. 20, 2014, 8 pages.
Ruff et al., "Deep One-Class Classification", Proceedings of the 35th International Conference on Machine Learning, 2018, 10 pages.
Wang et al., "Residual Attention Network for Image Classification", Apr. 23, 2017, 9 pages.
Zhang et al., "The Unreasonable Effectiveness of Deep Features as a Perceptual Metric", Jan. 11, 2018, 14 pages.

*Primary Examiner* — Nguyen T Truong

(57) ABSTRACT

A method for analyzing an image for anomaly detection includes obtaining a first image. The method also includes generating a second image by auto-encoding the first image. The method additionally includes extracting first and second feature vectors from the first and second images, respectively. The method further includes filtering each of the first and second feature vectors by using a filtering vector generated based on first distance values between first respective elements of the first and second feature vectors. Additionally, the method includes determining whether there is an anomaly in the first image based on second distance values between second respective elements of the filtered first and second feature vectors.

20 Claims, 17 Drawing Sheets

METHOD AND ELECTRONIC DEVICE FOR ANALYZING IMAGE

CROSS-REFERENCE TO RELATED APPLICATION

This application is based on and claims priority under 35 U.S.C. § 119 to Korean Patent Application No. 10-2019-0115481 filed on Sep. 19, 2019 in the Korean Intellectual Property Office, the disclosure of which is incorporated by reference herein in its entirety.

BACKGROUND

1. Field

The disclosure relates to a method and device for analyzing an image. More particularly, the disclosure relates to a method and device for analyzing an image for anomaly detection.

2. Description of the Related Art

Recently, technologies for detecting defects in goods produced in an automated product manufacturing process or defects in a particular process or equipment are being actively researched.

In this regard, anomaly detection, which is a data classification technology for detecting a product that shows a different pattern from patterns shown by normal products and abnormal data associated with the product, has often been used as a technology to detect defects that may occur in the product manufacturing process, and there are ever-increasing demands for such a technology for anomaly detection in system operation and security in addition to a data management area associated with the product manufacturing process.

As high-yield manufacturing processes usually have low defective rates, it is difficult to secure sufficient abnormal data. Unlike a deep-learning based algorithm that requires both normal data and abnormal data, anomaly detection allows detection of abnormal data based on normal data and is thus usually used in high-yield manufacturing processes.

However, common anomaly detection still has a limit to obtaining discriminating reconstruction error because the anomaly detection uses only normal data and uses general features as they are, which are extracted from each of input data and reconstruction data output by entering the input data to an auto-encoder.

Moreover, the common anomaly detection merely improves performance of the auto-encoder itself, but does not allow various uses of the features extracted from each of the input data and the reconstruction data output by entering the input data to the auto encoder.

Accordingly, for the anomaly detection that only uses normal data, there is a need for a method of measuring a discriminating reconstruction error and a technology to utilize the features from each of the input data and the reconstruction data.

SUMMARY

An embodiment of the disclosure provides an image analysis method for anomaly detection and an electronic device for performing the method.

Another embodiment of the disclosure provides a method and device for analyzing an image to determine an anomaly in the image using an auto-encoder.

Additional aspects will be set forth in part in the description which follows and, in part, will be apparent from the description, or may be learned by practice of the presented embodiments of the disclosure.

According to an embodiment of the disclosure, a method, performed by an electronic device, of analyzing an image includes: obtaining a first image; generating a second image by auto-encoding the first image; extracting first and second feature vectors from the first and second images, respectively; filtering each of the first and second feature vectors by using a filtering vector generated based on distance values between respective elements of the first and second feature vectors; and determining whether there is an anomaly in the first image based on distance values between respective elements of the filtered first and second feature vectors.

The generating of the second image may include upon reception of the first image, generating the second image using a first neural network model which reconstructs the first image by encoding the first image and decoding the encoded first image.

The extracting of the first and second feature vectors may include upon receiving the first image or the second image, extracting the first and second feature vectors by using a second neural network model which outputs feature values determined based on correlations between pixel information of the first image or the second image and a preset sized kernel.

The filtering may include determining the filtering vector having the same dimension as the first and second feature vectors based on distance values between respective elements of the first and second feature vectors; and performing element-wise multiplication of the first and second feature vectors by the filtering vector.

The determining of the filtering vector may include: generating the filtering vector to contain distance values between respective elements of the first and second feature vectors as element values of the filtering vector; adjusting the element values in the filtering vector based on whether the element value of each element in the filtering vector is greater than a preset first threshold; and determining the filtering vector to contain the adjusted element values as element values of the filtering vector.

The determining of the filtering vector may include: re-adjusting the element values of the filtering vector based on whether the sum of all the element values in the filtering vector is not greater than a second threshold; and determining the filtering vector to contain the re-adjusted element values as element values of the filtering vector.

The adjusting of the element values of the filtering vector may include: adjusting those of the element values of the filtering vector, which are greater than the first threshold, to 0; and adjusting those of the element values of the filtering vector, which are not greater than the first threshold, to 1.

The generating of the filtering vector may include: obtaining a plurality of training images and a plurality of reconstructed images corresponding to the plurality of training images; combining distance values between respective elements of feature vectors extracted from the plurality of training images and the plurality of reconstructed images corresponding to the plurality of training images, respectively; and generating the filtering vector to contain the combined distance values between the respective elements as element values of the filtering vector.

The determining of whether there is an anomaly in the first image may include: determining a mean square error (MSE) based on distance values between respective elements of the filtered first and second feature vectors; and determining whether there is an anomaly in the first image based on whether the MSE is greater than a preset third threshold.

The second image may be a reconstructed image having the same dimension as the first image, and the first feature vector, the second feature vector and the filtering vector may have the same dimension and may be determined based on a pixel size of the first image.

According to another embodiment of the disclosure, an electronic device for analyzing an image includes: a memory storing one or more instructions; and at least one processor, wherein the at least one processor is configured to execute the one or more instructions to: obtain a first image, generate a second image by auto-encoding the first image, extract first and second feature vectors from the first and second images, respectively, filter each of the first and second feature vectors by using a filtering vector generated based on distance values between respective elements of the first and second feature vectors, and determine whether there is an anomaly in the first image based on distance values between respective elements of the filtered first and second feature vectors.

The at least one processor is configured to execute the one or more instructions to, upon reception of the first image, generate the second image using a first neural network model which reconstructs the first image by encoding the first image and decoding the encoded first image.

The at least one processor is configured to execute the one or more instructions to, upon receiving the first image or the second image, extract the first and second feature vectors by using a second neural network model which outputs feature values determined based on correlations between pixel information of the first image or the second image and a preset sized kernel.

The at least one processor is further configured to execute the one or more instructions to determine the filtering vector having the same dimension as the first and second feature vectors based on distance values between respective elements of the first and second feature vectors, and perform element-wise multiplication of the first and second feature vectors by the filtering vector.

The at least one processor is further configured to execute the one or more instructions to generate the filtering vector to contain distance values between respective elements of the first and second feature vectors as element values of the filtering vector, adjust the element values in the filtering vector based on whether the element value of each element in the filtering vector is greater than a preset first threshold, and determine the filtering vector to contain the adjusted element values as element values of the filtering vector.

The at least one processor is further configured to execute the one or more instructions to re-adjust the element values of the filtering vector based on whether the sum of all the element values in the filtering vector is not greater than a second threshold, and determining the filtering vector to contain the re-adjusted element values as element values of the filtering vector.

The at least one processor is further configured to execute the one or more instructions to adjust those of the element values of the filtering vector, which are greater than the first threshold, to 0, and adjust those of the element values of the filtering vector, which are not greater than the first threshold, to 1.

The at least one processor is further configured to execute the one or more instructions to obtain a plurality of training images and a plurality of reconstructed images corresponding to the plurality of training images; combining distance values element-wise between respective elements of feature vectors extracted from the plurality of training images and the plurality of reconstructed images corresponding to the plurality of training images, respectively, and generate the filtering vector to contain the combined distance values between the respective elements as element values of the filtering vector.

According to another embodiment of the disclosure, a computer-readable recording medium having stored therein a program for: obtaining a first image; generating a second image by auto-encoding the first image; extracting first and second feature vectors from the first and second images, respectively; filtering each of the first and second feature vectors by using a filtering vector generated based on distance values between respective elements of the first and second feature vectors; and determining whether there is an anomaly in the first image based on distance values between respective elements of the filtered first and second feature vectors.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
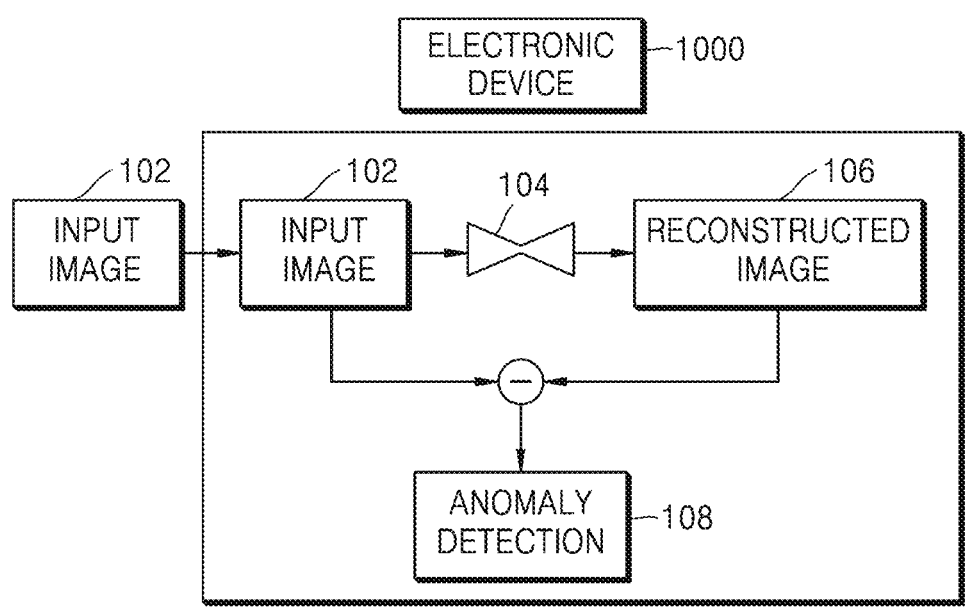
FIG. 1 illustrates an image analysis method in an electronic device for anomaly detection, according to an embodiment of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms as used herein will be described before detailed descriptions of embodiments of the disclosure.

The terms are selected as common terms widely used now, taking into account principles of the disclosure, which may however depend on intentions of those of ordinary skill in the art, judicial precedents, emergence of new technologies, and the like. Some terms as herein used are selected at the applicant's discretion, in which case, description of the disclosure will be explained later in detail. Therefore, the terms should be defined based on their meanings and descriptions throughout the disclosure.

The term "include (or including)" or "comprise (or comprising)" is inclusive or open-ended and does not exclude additional, unrecited elements or method steps. "Unit", "module", "block", etc., as used herein each represent a unit for handling at least one function or operation, and may be implemented in hardware, software, or a combination thereof.

Embodiments of the disclosure will now be described in detail with reference to accompanying drawings to be readily practiced by those of ordinary skill in the art. However, the embodiments of the disclosure may be implemented in many different forms, and not limited thereto as will be discussed herein. In the drawings, parts unrelated to the description are omitted for clarity, and like numerals refer to like elements throughout the specification.

Throughout the disclosure, the expression "at least one of a, b or c" indicates only a, only b, only c, both a and b, both a and c, both b and c, all of a, b, and c, or variations thereof.

FIG. 1 illustrates an image analysis method in an electronic device for anomaly detection, according to an embodiment of the disclosure.

In an embodiment of the disclosure, an electronic device 1000 may obtain an input image 102, and determine whether there is an anomaly in the input image 102. For example, the electronic device 1000 may enter the input image 102 to a pre-trained auto-encoder 104 to obtain a reconstructed image 106 with reconstructed image features of the input image 102, and determine whether there is an anomaly in the input image 102 in block 108 based on a reconstruction error between the input image 102 and the reconstructed image 106.

For example, the auto-encoder 104 used by the electronic device 1000 for reconstruction of an input image may include an unsupervised learning based artificial neural network model that is trained to approximate a desired output to an input. For example, the auto-encoder 104 may extract a certain feature in the input image entered to an input layer by encoding the input image with a hidden layer. The auto-encoder 104 may compress the input image having higher dimensional data into certain image features having lower dimensional information by encoding the input image.

Furthermore, the auto-encoder 104 may scale up the features of the input image to a high dimensional image, which is equal to the input image, by decoding the features back. In an embodiment of the disclosure, the procedure in which the electronic device 1000 extracts features of an input image by encoding the input image and decodes the features of the input image back may correspond to an auto-encoding procedure for the input image.

The electronic device 1000 may extract features of the input image in the process of auto-encoding on the input image, and reconstruct features of the input image by scaling up the extracted features to a higher dimensional image, which is identical to the input image. As the auto-encoder 104 is generally trained to extract key information from among features of the input data by repeating the process of reconstructing high dimensional input data, the auto-encoder 104 does not output the raw input data but output approximate data to the input data, thereby effectively representing the input data.

In an embodiment of the disclosure, the auto-encoder 104 used by the electronic device 1000 to reconstruct the input image may include an input layer, a hidden layer, and an output layer, and the input layer and the hidden layer may correspond to an encoder for compressing the high dimensional input data to low dimensional features. Furthermore, the hidden layer and the output layer may correspond to a decoder for scaling up the compressed low dimensional features to high dimensional data, which is equal to the input data. In an embodiment of the disclosure, the auto-encoder 104 may include at least one of an undercomplete auto-encoder, a stacked auto-encoder, a sparce auto-encoder, or a denoising auto-encoder, without being limited thereto.

The electronic device 1000 may determine a reconstruction error between the reconstructed image obtained by entering the input image to the auto-encoder 104 and the input image. In an embodiment of the disclosure, the reconstruction error may be a mean square error (MSE) of the features output from each of the input image and the reconstructed image, but is not limited thereto.

In an embodiment of the disclosure, the electronic device 1000 may enter each of the input image and the reconstructed image to a preset artificial neural network model to extract input image features from the input image and reconstructed image features from the reconstructed image. The artificial neural network used by the electronic device 1000 to extract features from the images may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto. In an embodiment of the disclosure, a CNN used by the electronic device 1000 to extract features from an image may include at least one of LeNet, AlexNet, ZFNet, Google Net, VGGNet, or ResNet.

The electronic device 1000 may determine a reconstruction error (e.g., an MSE) between the input image feature extracted from the input image 102 and the reconstructed image feature extracted from the reconstructed image 106, and determine an anomaly in block 108 in the input image based on whether the reconstruction error is greater than a preset threshold.

In an embodiment of the disclosure, the electronic device 1000 may be used in a computing device to detect a product anomaly in an automated production line. Alternatively, the electronic device 1000 may be a computing device, a personal computer (PC), a server, a microserver, an edge computing server for performing multi-access edge computing, a kiosk, or a non-mobile computing device for testing products, which includes the auto-encoder 104 and at least one CNN model to extract features of an image, without being limited thereto.

A procedure in which the electronic device 1000 determines the reconstruction error using features obtained from each of an input image and a reconstructed image obtained by auto-encoding the input image will now be described.

Figure 2:
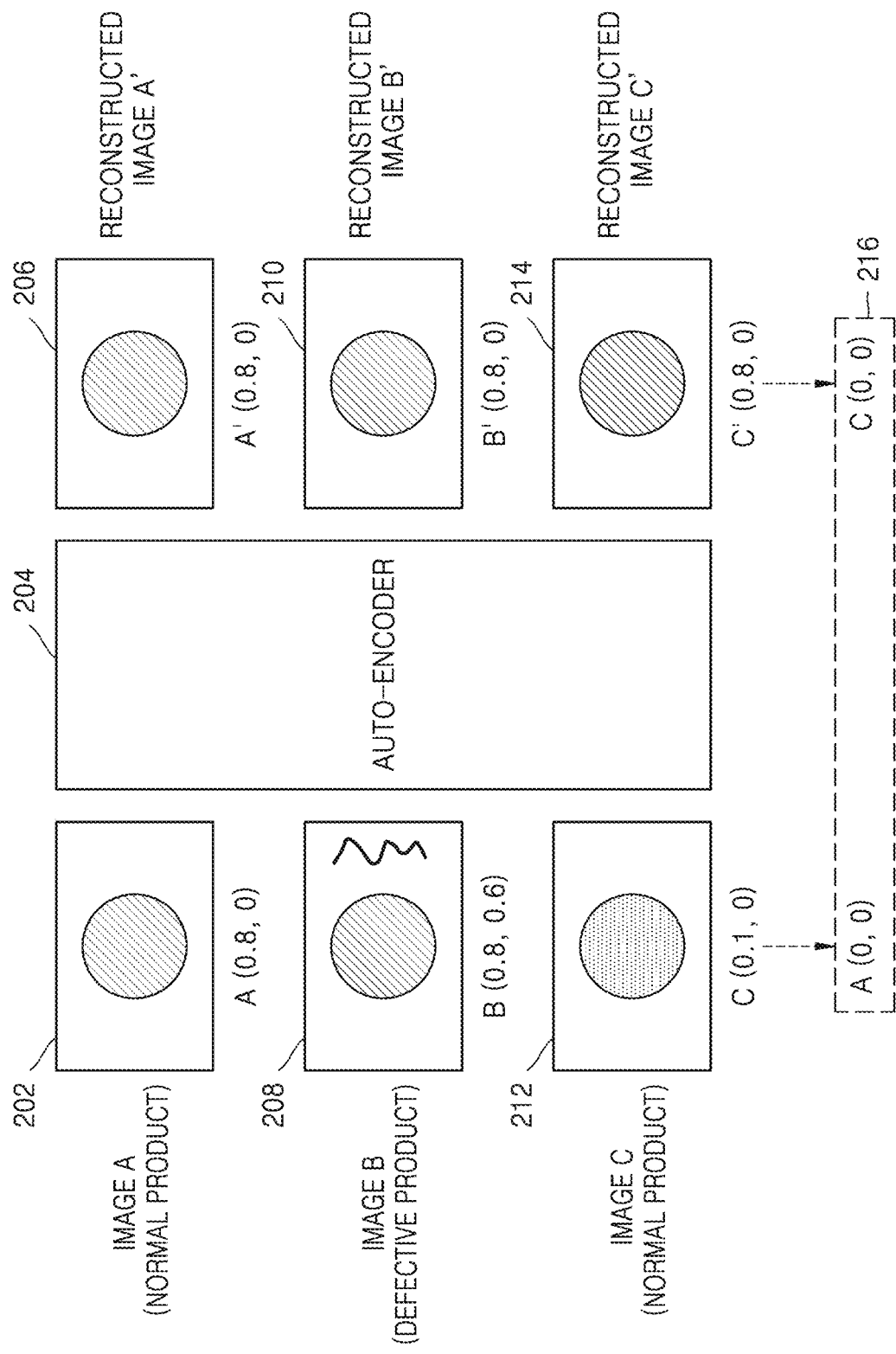
FIG. 2 illustrates a diagram for describing a procedure in which an electronic device determines a reconstruction error, according to an embodiment of the disclosure.

FIG. 2 illustrates a diagram for describing a procedure in which an electronic device determines a reconstruction error, according to an embodiment of the disclosure.

In an embodiment of the disclosure, the electronic device 1000 may obtain image A 202 about a normal product, image B 208 about a defective product, or image C 212 about another normal product. The electronic device 1000 may obtain reconstructed image A' 206 by auto-encoding the image A 202 about a normal product using a pre-trained auto-encoder 204. The electronic device 1000 may also obtain reconstructed image B' 210 by auto-encoding the image B 208 about a defective product. The electronic device 1000 may also obtain reconstructed image C' 214 by auto-encoding the image C 212 about another normal product.

The electronic device 1000 may extract image features from each of the image A 202, the image B 208, the image C 212, the reconstructed image A' 206, the reconstructed image B' 210, and the reconstructed image C' 214, using a pre-trained CNN model. The electronic device 1000 may extract the features of the input image and the reconstructed image in the form of feature vectors having a preset dimension. In an embodiment of the disclosure, the electronic device 1000 may extract the features of the input image and the reconstructed image in the form of feature maps having a preset dimension.

In an embodiment of the disclosure, the dimension of a feature vector extracted from each of the input image and the reconstructed image using a pre-trained neural network model may be determined based on the size of the input image, the size of a kernel of the CNN, and the size of padding added to the input image to compensate for data losses at edges on the input image in a convolution process.

The electronic device 1000 may determine an anomaly in the input image based on whether an MSE of a first feature vector extracted from the input image and a second feature vector extracted from the reconstructed image obtained by auto-encoding the input image is greater than a preset threshold.

Referring to FIG. 2, the electronic device 1000 may receive the image A 202, extract first feature vector A (0.8, 0) from the image A 202, and extract second feature vector A' (0.8, 0) from the reconstructed image A' 206 resulting from reconstruction of the input image. In an embodiment of the disclosure, the electronic device 1000 may determine whether there is an anomaly in the input image based on whether an MSE of the first feature vector extracted from the input image and the second feature vector extracted from the reconstructed image obtained by auto-encoding the input image is greater than a preset threshold 0.15. The threshold compared with the MSE by the electronic device 1000 to determine whether there is an anomaly in the input image is not limited to 0.15, and may vary depending on the performance of the auto-encoder 204 or the performance of the CNN model for extracting features from an image.

For example, the electronic device 1000 may determine an MSE of the extracted first feature vector A (0.8, 0) and second feature vector A' (0.8, 0) to be 0, which is less than the preset threshold 0.15, so determine the image A 202 as a normal product image. Furthermore, in an embodiment of the disclosure, the electronic device 1000 may receive the image B 208, extract first feature vector B (0.8, 0.6) from the image B 202, and extract second feature vector B' (0.8, 0) from the reconstructed image B' 210 resulting from reconstruction of the input image B. As the auto-encoder 204 of the electronic device 1000 is a neural network model trained to output a reconstructed image including image features similar to the features of the input image, the auto-encoder 2024 may output the reconstructed image B' 210 representing the second feature vector B' (0.8, 0) when the defective product image B 208 corresponding to the first feature vector B (0.8, 0.6) is input. The electronic device 1000 may determine an MSE of the first feature vector B (0.8, 0.6) and the second feature vector B' (0.8, 0) to be 0.18 (i.e., 0.6*0.6/2), which is greater than the preset threshold 0.15, so determine the image B 202 as a defective product image.

Referring to the image C 212 and the reconstructed image C' 214, an occasion when the electronic device 1000 determines the image obtained by the electronic device 1000 as a defective product image even though the image is actually about a normal product will now be described.

For example, the electronic device 1000 may receive the image C 212 about a normal product, extract first feature vector C (0.1, 0) from the image C 212, and extract second feature vector C' (0.8, 0) from the reconstructed image C' 214 resulting from reconstruction of the image C 212. As the auto-encoder 204 of the electronic device 1000 is a neural network model trained to output a reconstructed image including image features similar to the features of the input image, the auto-encoder 204 may output the reconstructed image C' 214 representing the second feature vector C' (0.8, 0) when the image C 212 corresponding to the first feature vector C (0.1, 0) is input.

Although the electronic device 1000 has actually obtained an image about a normal product, an MSE of the first feature vector C (0.1, 0) and the second feature vector C' (0.8, 0) is 0.245 (i.e., 0.7*0.7/2), which is greater than the preset threshold 0.15, so the electronic device 1000 may determine the image C 202 as a defective product image. In other words, although the electronic device 1000 has actually obtained an input image about a normal product, it may wrongly determine that the input image is about a defective product as a large reconstructed error between the input image and the reconstructed image obtained by entering the input image to the auto-encoder is measured.

Like the occasion described above with reference to the image C 212 and the reconstructed image C' 214, common anomaly detection technologies using a reconstruction error between each input image and the reconstructed image output through the auto-encoder has difficulty in obtaining a discriminating reconstruction error due to noise contained in the input image, a performance limit of the auto-encoder itself, etc. Although many technologies related to improving performance of the auto-encoder itself to address false alarm problems of electronic devices have been published, anomaly detection technologies for solving the false alarm problem based on features output from each of the input image and the reconstructed image output through the auto-encoder have never been disclosed. An image analysis procedure in which the electronic device 1000 uses features output from each of an input image and a reconstructed image obtained by auto-encoding the input image to secure a discriminating reconstruction error will now be described.

Figure 3:
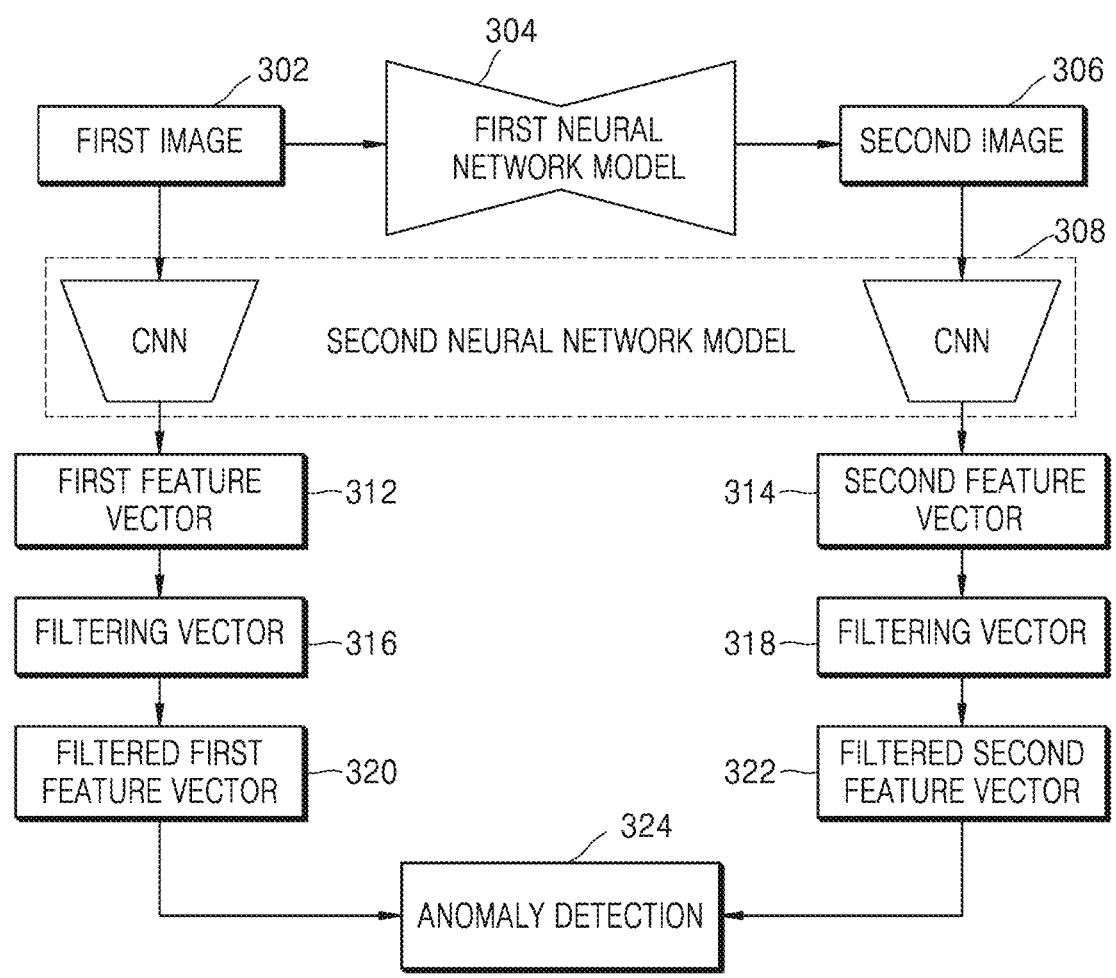
FIG. 3 illustrates a diagram for describing a procedure in which an electronic device analyzes images for anomaly detection, according to an embodiment of the disclosure.

FIG. 3 illustrates a diagram for describing a procedure in which an electronic device analyzes images for anomaly detection, according to an embodiment of the disclosure.

In an embodiment of the disclosure, the electronic device 1000 may obtain a first image 302, and obtain a second image 306 by entering the first image 302 to a first neural network model 304. For example, the first neural network model 304 may be an artificial neural network model which receives and encodes the first image 302 and outputs the second image 306 with reconstructed features of the first image by decoding the encoded first image back. In an embodiment of the disclosure, the first neural network model may be an auto-encoder, which is a non-supervised learning based artificial neural network model trained to make image features of a desired output image approximate to image features of an input image.

Upon receiving the first image 302 or the second image 306, the electronic device 1000 may extract features of the first image and features of the second image using a second neural network model 308 that outputs feature values determined based on correlations between pixel information of the first image 302 or the second image 306 and a preset sized kernel. In an embodiment of the disclosure, the electronic device 1000 may use the pre-trained second neural network model 308 to extract image features from an image in the form of a feature vector.

Specifically, the electronic device 1000 may use the pre-trained second neural network model 308 to extract a first feature vector 312 and a second feature vector 314 from the first image 302 and the second image 306, respectively. In an embodiment of the disclosure, the second neural network model 308 may be a CNN model in a universal VGGNet structure, but is not limited thereto and may be any of the artificial neural network models as described above in FIG. 1. Furthermore, in an embodiment of the disclosure, the second neural network model 308 may include one or more CNN models having the same structure.

The electronic device 1000 may determine filtering vectors 316 and 318 for filtering at least one element of the extracted first and second feature vectors 312 and 314, respectively, and filter the first and second feature vectors 312 and 314 using the determined filtering vectors 316 and 318. In an embodiment of the disclosure, the electronic device 1000 may determine the filtering vectors 316 and 318 based on distance values between the respective elements of the first and second feature vectors 312 and 314. The electronic device 1000 may perform anomaly detection by filtering the first and second feature vectors 312 and 314 using the filtering vectors 316 and 318, respectively, and determining an anomaly in the first image using the filtered first and second feature vectors.

Referring to FIG. 3, the operation of the electronic device 1000 filtering the first and second feature vectors 312 and 314 using the filtering vectors 316 and 318 is shown as being performed outside the second neural network model 308, but is not limited thereto and may be performed inside the second neural network model 308. When the operation of the electronic device 1000 filtering the first and second feature vectors 312 and 314 using the filtering vectors 316 and 318 is performed in the second neural network model 308, the second neural network model 308 may further include a masking layer for filtering the first and second feature vectors 312 and 314.

The electronic device 1000 may secure a discriminating reconstruction error by filtering at least one feature value in the first feature vector 312 and the second feature vector 314 using the filtering vectors 316 and 318 determined based on distance values between the respective elements of the first and second feature vectors 312 and 314. In the disclosure, the electronic device 1000 may accurately determine whether there is an anomaly in the first image 302 based on the discriminating reconstruction error between the first and second feature vectors 312 and 314.

Figure 4:
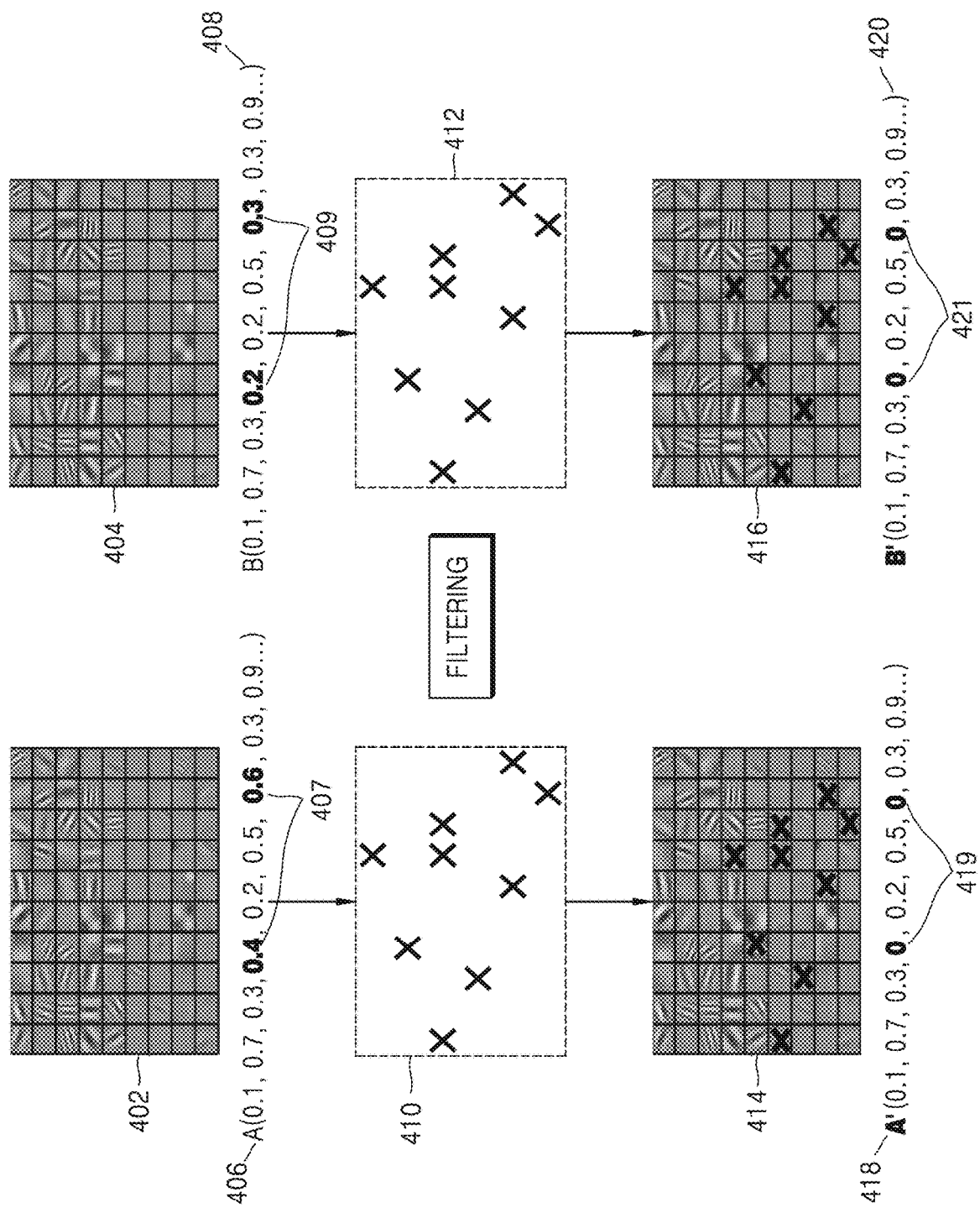
FIG. 4 illustrates a diagram for describing a procedure in which an electronic device filters feature vectors using a filtering vector, according to an embodiment of the disclosure.

FIG. 4 illustrates a diagram for describing a procedure in which an electronic device filters feature vectors using a filtering vector, according to an embodiment of the disclosure.

In an embodiment of the disclosure, the electronic device 1000 may auto-encode a first image to generate a second image, and extract a first feature vector 406 and a second feature vector 408 from the first image and the second image, respectively. The first feature vector 406 and the second feature vector 408 extracted by the electronic device 1000 using the second neural network model 308 may even be visualized into a first feature map 402 and a second feature map 404. The size of the first feature map 402 and the second feature map 404 shown in FIG. 4 may be determined based on the size of the input image entered to the second neural network model 308, the size of a kernel used for convolutional operation, or the size of padding added to edges of the input image.

Unlike a traditional abnormal detection by which the electronic device 1000 uses feature vectors intact, which are output from an input image and a reconstructed image resulting from auto-encoding of the input image, and thus fails to secure discriminating reconstruction errors, the electronic device 1000 in accordance with the disclosure may filter the feature vectors output from each of the input image and the reconstructed image and thus secure a discriminating reconstruction error.

For example, the electronic device 1000 may extract first feature vector A (0.1, 0.7, 0.3, 0.4, 0.2, 0.5, 0.6, 0.3, 0.9, . . . ) 406 from the first image, and extract second feature vector B (0.1, 0.7, 0.3, 0.2, 0.2, 0.5, 0.3, 0.3, 0.9, . . . ) 408 from the second image with reconstructed features of the first image, which is obtained by auto-encoding the first image. In FIG. 4, the numbers contained in the first feature vector 406 and the second feature vector 408 may represent element values of elements contained in the feature vectors 406 and 408.

In the disclosure, elements of a feature vector refer to vector elements that constitute the feature vector, and elements values of the feature vector may refer to values of the vector elements that constitute the feature vector. Specifically, the element values of the feature vector may represent correlations between a kernel of a CNN and pixel values in an area of the input image that corresponds to the size of the kernel.

The electronic device 1000 may calculate distance values between respective elements of the first and second feature vectors 406 and 408, and identify elements 407 and 409 having a distance value greater than a first threshold (e.g., 0.1).

For example, a first element 0.1 of the first feature vector 406 and a first element 0.1 of the second feature vector 408 have a distance value of 0, and a second element 0.7 of the first feature vector 406 and a second element 0.7 of the second feature vector 408 have a distance value of 0. A third element 0.3 of the first feature vector 406 and a third element 0.3 of the second feature vector 408 also have a distance value of 0. However, a fourth element 0.4 of the first feature vector 406 and a fourth element 0.2 of the second feature vector 408 have a distance value of 0.2, and a seventh element 0.6 of the first feature vector 406 and a seventh element 0.3 of the second feature vector 408 have a distance value of 0.3.

In an embodiment of the disclosure, the electronic device 1000 may determine an absolute value of a difference between an element value of an element in the first feature vector and an element value of an element in the second feature vector that is placed in the same position as the element in the first feature vector as a distance value between the elements of the first and second feature vectors, without being limited thereto. Alternatively, the electronic device 1000 may determine the square of an absolute value of a difference between an element value of an element in the first feature vector and an element value of an element in the second feature vector that is placed in the same position as the element in the first feature vector as a distance value between the elements of the first and second feature vectors.

The electronic device 1000 may identify a distance value that is greater than the first threshold from among distance values between the respective elements of the first and second feature vectors, and identify the element 407 of the first feature vector 406 and the element 409 of the second feature vector 408, which have the distance value greater than the first threshold.

The electronic device 1000 may use the filtering vectors 410 and 412 to filter the first and second feature vectors 406 and 408, respectively. For example, the electronic device 1000 may eliminate elements of the first and second feature vectors 406 and 408 having a greater distance value between them by filtering the first and second feature vectors 406 and 408 using the filtering vectors 410 and 412, respectively. Specifically, the electronic device 1000 may set element values of the fourth and seventh elements of the first feature vector to '0' by filtering the first feature vector 406 using the filtering vector 410, and set element values of the fourth and seventh elements of the second feature vector to '0' by filtering the second feature vector 408 using the filtering vector 412.

Referring to FIG. 4, the procedure in which the electronic device 1000 filters the first and second feature vectors 406 and 408 using the filtering vectors 410 and 412, respectively, may correspond to a procedure of masking the lattice cells in question of the first and second feature maps 402 and 404 In the disclosure, the electronic device 1000 does not use the first feature vector 406 and the second feature vector 408 extracted from the first image 302 and the second image 306 generated by auto-encoding the first image 302, respectively, as they are, but eliminates the element 407 of the first feature vector 406 and the element 409 of the second feature vector 408, which have a distance between them, which is greater than the first threshold, among the distance values between the respective elements of the first and second feature vectors 406 and 408, thereby obtaining a discriminating reconstruction error.

Figure 5:
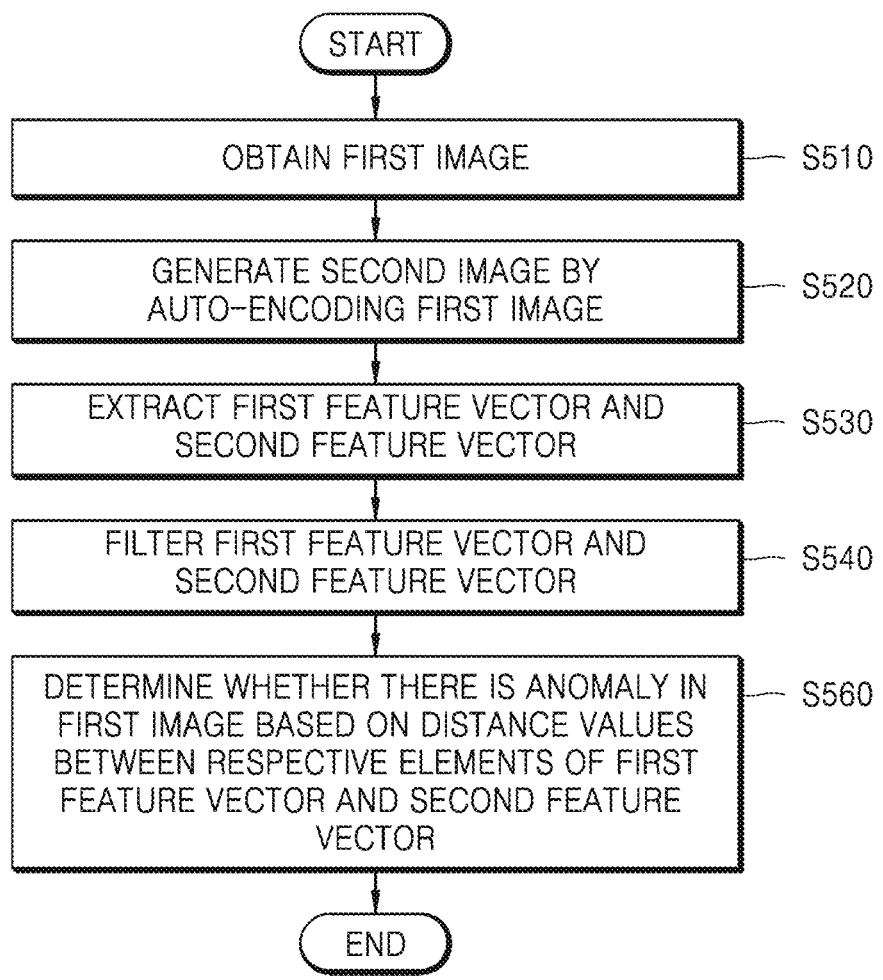
FIG. 5 illustrates a flowchart of an image analysis method in an electronic device, according to an embodiment of the disclosure.

FIG. 5 illustrates a flowchart of an image analysis method in an electronic device, according to an embodiment of the disclosure.

In operation S510, the electronic device 1000 obtains a first image. In an embodiment of the disclosure, the electronic device 1000 may obtain the first image to be subjected to anomaly detection, using a camera module of the electronic device.

In operation S520, the electronic device 1000 may generate a second image by auto-encoding the first image. For example, upon reception of the first image, the electronic device 1000 may generate the second image using a first neural network model that reconstructs the first image by encoding the first image and decoding the encoded first image. The auto-encoding process for the first image performed by the electronic device 1000 may correspond to the procedure of FIG. 2 in which the electronic device 1000 outputs the reconstructed images A' 206, B' 210, and C' 214 by entering the images A 202, B 208, and C 212 into the auto-encoder 204, so the detailed descriptions thereof will not be repeated.

In operation S530, the electronic device 1000 may extract first and second feature vectors from the first and second images, respectively. For example, upon receiving the first image or the second image, the electronic device 1000 may output first and second feature vectors using a second neural network model that outputs feature values determined based on correlations between pixel information of the first image or the second image and a preset sized kernel.

In an embodiment of the disclosure, the second neural network model may be a CNN model having a structure in which a convolution layer and a pooling layer are repeatedly used, and with a fully-connected layer connected to an output stage. The electronic device 1000 may train the second neural network model in advance based on image data in a public image database such as ImageNet. For example, the electronic device 1000 may train the second neural network model in advance by modifying and refining layers in the second neural network model and weights on connection intensity between the layers based on the image data in the public image database.

In operation S540, the electronic device 1000 may filter each of the first and second feature vectors using a filtering vector generated based on distance values between the respective elements of the first and second feature vectors. A detailed method by which the electronic device 1000 filters the first and second feature vectors using the filtering vector may correspond to the procedure of FIG. 4 in which the electronic device 1000 filters the first and second feature vectors 406 and 408 using the filtering vectors 410 and 412, respectively, so the detailed descriptions thereof will not be repeated.

In operation S560, the electronic device 1000 may determine whether there is an anomaly in the first image based on distance values between the respective elements of the first and second feature vectors filtered using the filtering vectors. For example, the electronic device 1000 may determine an MSE based on distance values between the respective elements of the filtered first and second feature vectors, and determine whether there is an anomaly in the first image based on whether the MSE is greater than a preset third threshold.

Figure 6:
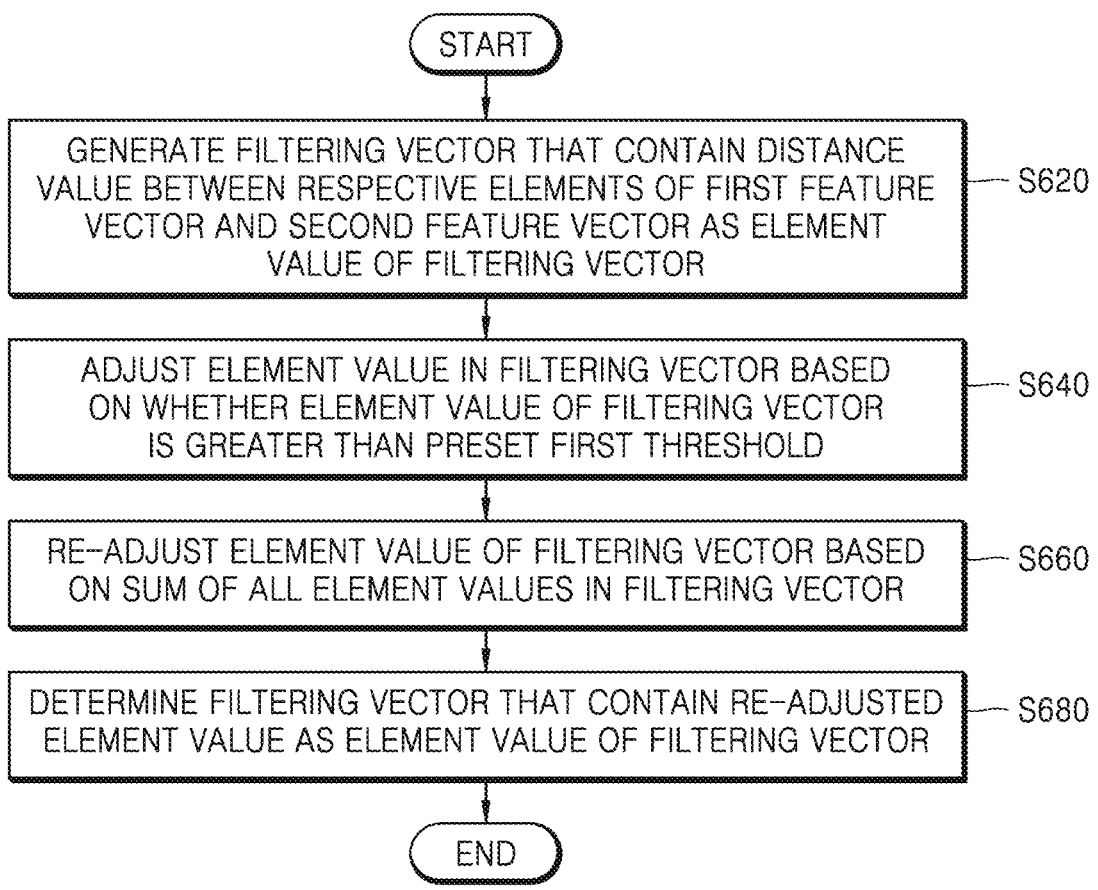
FIG. 6 illustrates a flowchart of a detailed method by which an electronic device determines a filtering vector, according to an embodiment of the disclosure.

FIG. 6 illustrates a flowchart of a detailed method by which an electronic device determines a filtering vector, according to an embodiment of the disclosure.

Figure 7:
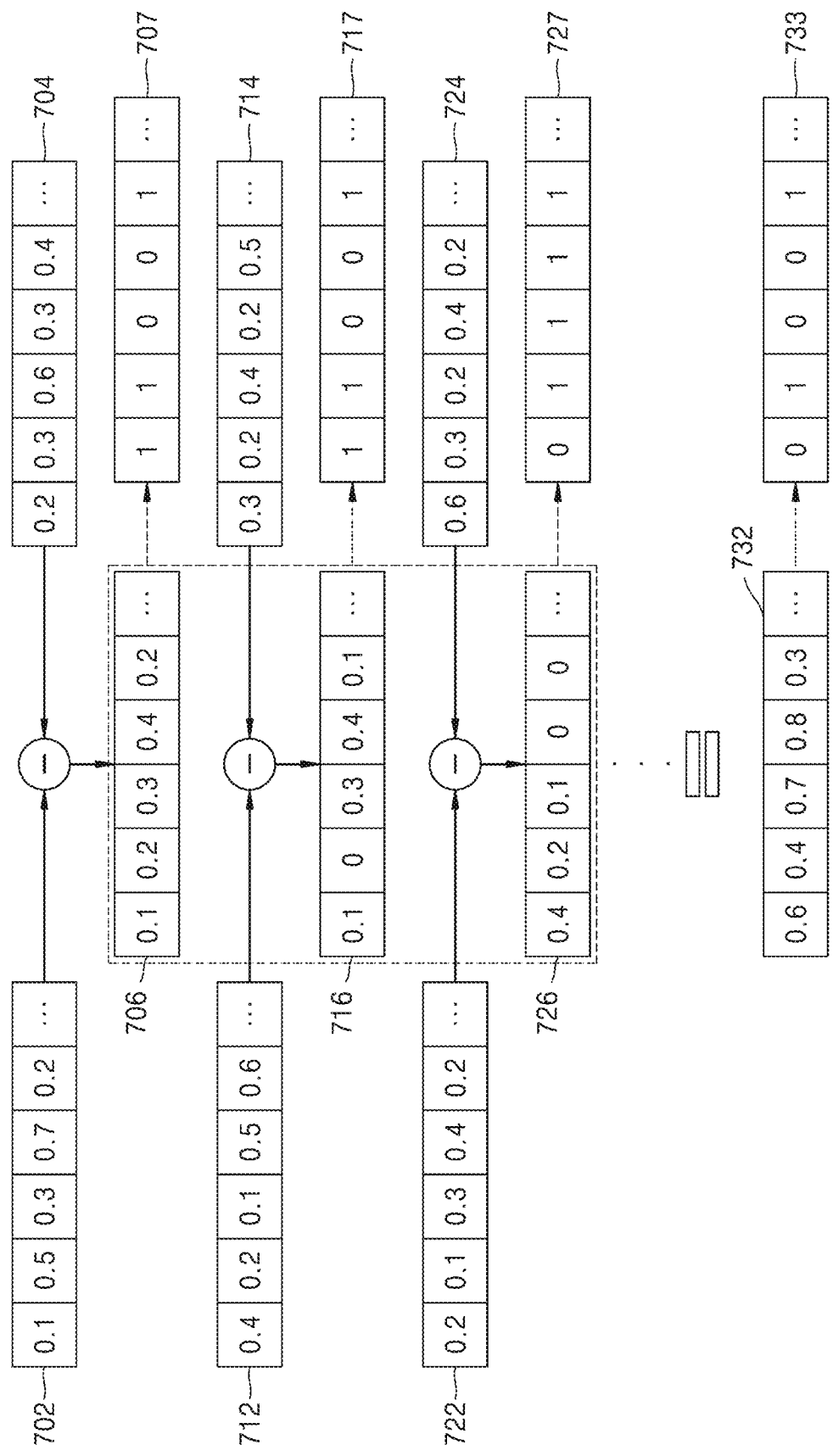
FIG. 7 illustrates a diagram of describing a detailed method by which an electronic device determines a filtering vector, according to an embodiment of the disclosure.

FIG. 7 illustrates a diagram for describing a detailed method by which an electronic device determines a filtering vector, according to an embodiment of the disclosure. A method by which the electronic device 1000 determines a filtering vector as shown in FIG. 6 will now be described in conjunction with FIG. 7.

In operation S620, the electronic device 1000 may generate a filtering vector containing distance values between the respective elements of first feature vectors and second feature vectors as element values of the filtering vector. For example, the electronic device 1000 may determine distance values between the respective elements of a first feature vector 702 and a second feature vector 704, and determine a filtering vector 706 that contains the distance values as element values.

In operation S640, the electronic device 1000 may adjust the element values in the filtering vector based on whether the element value of each element in the filtering vector is greater than a preset first threshold. For example, when the first threshold is set to 0.2, the electronic device 1000 may adjust a third element value 0.3 and a fourth element value 0.4, which are greater than 0.2 among element values (e.g., 0.1, 0.2, 0.3, 0.4 . . . ) of the filtering vector 706.

In an embodiment of the disclosure, the electronic device 1000 may determine a filtering vector 707 by adjusting those of the element values of the filtering vector 706, which are greater than 0.2, to 0, and adjusting those of the element values of the filtering vector 706, which are not greater than 0.2, to 1. In other words, the electronic device 1000 may generate the filtering vector 707 that contains elements with element values 0 or 1 by adjusting those of the element values of the filtering vector 707, which are greater than the first threshold, to 0 and those which are not greater than the first threshold, to 1.

In an embodiment of the disclosure, the electronic device 1000 may filter the first feature vector (0.1, 0.5, 0.3, 0.7, 0.2 . . . ) 702 and the second feature vector (0.2, 0.3, 0.6, 0.3, 0.4 . . . ) 704 by multiplying the filtering vector 707 by the first feature vector 702 and the second feature vector 704 element-wise. For example, the electronic device 1000 may generate a filtered first feature vector (0.1, 0.5, 0, 0, 0.2 . . . ) by filtering the first feature vector 702 and a filtered second feature vector (0.2, 0.3, 0, 0, 0.4 . . . ) by filtering the second feature vector 704.

In operation S660, the electronic device 1000 may re-adjust element values of the filtering vector based on the sum of all the elements in the filtering vector. In operation S680, the electronic device 1000 may determine a filtering vector that contains the re-adjusted element values as element values of the filtering vector.

For example, when the electronic device 1000 adjusts element values of the elements in the filtering vector to 0 or 1 based on whether the element values are greater than the first threshold, large distance values between the respective elements of the first and second feature vectors may be determined due to noise in the image or performance limits of the auto-encoder itself. As a result, the filtering vector also contains a lot of elements with element values that are greater than the first threshold, so the electronic device 1000 may more frequently adjust the element values of the filtering vector to 0 while adjusting the element values of the elements in the filtering vector based on the first threshold.

When more of the elements of the filtering vector have values of 0, a reconstruction error (e.g., an MSE) between the first and second feature vectors filtered using the filtering vector nears 0, so it is more likely that the electronic device 1000 determines the first image as an image about a normal product. However, when the electronic device 1000 determines an anomaly in the first image based on an excessively small reconstruction error, the electronic device 1000 may be more likely to determine even an image about a defective product as an image about a normal product, and thus may not accurately determine anomaly in the first image. Hence, there is a need to limit the number of elements with elements values of 0 in the filtering vector.

In an embodiment of the disclosure, the electronic device 1000 may re-adjust element values of the filtering vector based on whether the sum of all the element values in the filtering vector is not greater than a second threshold. For example, when the sum of all elements in the filtering vector 707 having adjusted to have element values 0 or 1 is not greater than the second threshold, 2, the electronic device 1000 may re-adjust the element values of the filtering vector 707 to ensure that the sum of all the elements in the filtering vector 707 is greater than the second threshold.

In an embodiment of the disclosure, the electronic device 1000 may determine a filtering rate in the filtering vector, and adjust element values in the filtering vector based on the filtering rate. In an embodiment of the disclosure, the filtering rate may refer to a rate of the number of elements with element values of 1 among the entire elements in the filtering vector.

In an embodiment of the disclosure, the electronic device 1000 may generate a filtering vector that contains distance values between the respective elements of the first and second feature vectors as filtering vector elements, adjust the element values of the filtering vector to 0 or 1 based on whether the element values of elements in the filtering vector are greater than a preset first threshold, and re-adjust a rate of the number of elements with element values of 1 among all the elements in the filtering vector based on a predefined filtering rate.

In an embodiment of the disclosure, the electronic device 1000 may obtain a plurality of training images, obtain a plurality of reconstructed images by auto-encoding the plurality of training images, and generate a filtering vector using the plurality of training images and the corresponding plurality of reconstructed images.

For example, referring to FIG. 7, the electronic device 1000 may obtain a first image and a second image with reconstructed features of the first image. The electronic device 1000 may extract the first feature vector 702 from the first image and the second feature vector 704 from the second image, and generate the filtering vector 706 that has distance values between the respective elements of the first feature vector 702 and the second feature vector 704 as element values.

Furthermore, referring to FIG. 7, the electronic device 1000 may obtain a third image and a fourth image with reconstructed features of the third image. The electronic device 1000 may extract a third feature vector 712 from the third image and a fourth feature vector 714 from the fourth image, and generate a filtering vector 716 that has distance values between the respective elements of the third feature vector 712 and the fourth feature vector 714 as element values.

Moreover, referring to FIG. 7, the electronic device 1000 may obtain a fifth image and a sixth image with reconstructed features of the fifth image. The electronic device 1000 may extract a fifth feature vector 722 from the fifth image and a sixth feature vector 724 from the sixth image, and generate a filtering vector 726 that has distance values between the respective elements of the fifth feature vector 722 and the sixth feature vector 724 as element values.

In an embodiment of the disclosure, the electronic device 1000 may generate a filtering vector 732 by combining all the filtering vectors 706, 716, and 726 together. The electronic device 1000 may adjust the element values in the filtering vector 732 to 0 or 1 based on whether the element value of each element in the filtering vector 732 is greater than a preset threshold. In an embodiment of the disclosure, the electronic device 1000 may determine a filtering vector 733 by adjusting those of the element values of the filtering vector 732, which are greater than the first threshold 0.5, to 0, and adjusting those of the element values of the filtering vector 732, which are not greater than the first threshold 0.5, to 1.

That is, the electronic device 1000 may obtain a plurality of training images and reconstructed images corresponding to the plurality of training images, extract feature vectors from each of the plurality of training images and the plurality of reconstructed images, combine distance values between the respective elements of the feature vectors, and generate a filtering vector that contains the combined distance values between the respective elements as elements. Furthermore, the electronic device 1000 may re-adjust element values of the filtering vector 733 based on whether the sum of all the element values in the filtering vector 733 is not greater than a second threshold.

Figure 8:
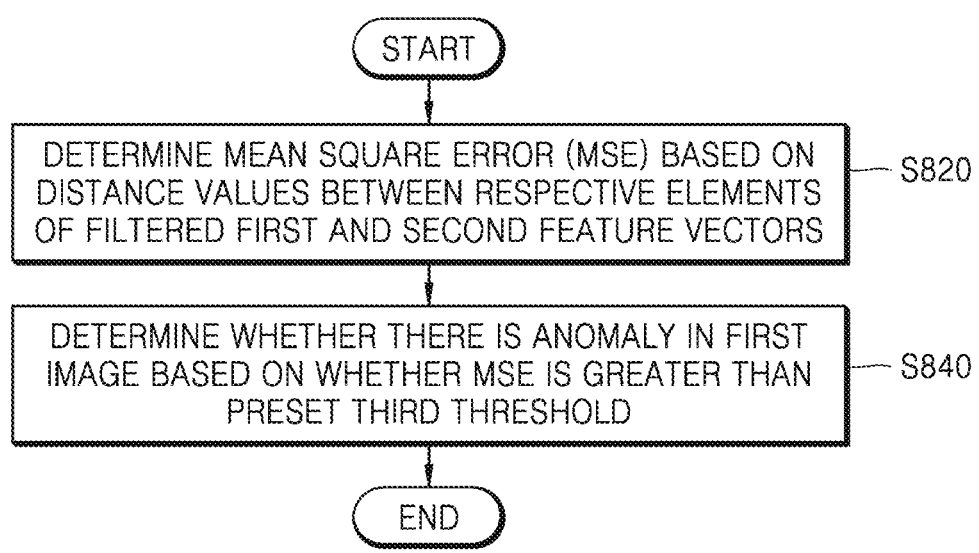
FIG. 8 illustrates a flowchart of a method by which an electronic device determines whether there is an anomaly in a first image, according to an embodiment of the disclosure.

FIG. 8 illustrates a flowchart illustrating a method by which an electronic device determines whether there is an anomaly in a first image, according to an embodiment of the disclosure.

In operation S820, the electronic device 1000 may determine an MSE based on distance values between the respective elements of filtered first and second feature vectors. Turning back to FIG. 7, the electronic device 1000 may determine the filtered first feature vector (0.1, 0.5, 0, 0, 0.2) obtained by filtering the first feature vector 702 using the filtering vector 707, and determine the filtered second feature vector (0.2, 0.3, 0, 0, 0.4) obtained by filtering the second feature vector 704 using the filtering vector 707. The electronic device 1000 may determine an MSE of the filtered first feature vector (0.1, 0.5, 0, 0, 0.2) and second feature vector (0.2, 0.3, 0, 0, 0.4). A method by which the electronic device 1000 determines the MSE between the feature vectors may correspond to the procedure of FIG. 2 in which the electronic device 1000 determines an MSE of the first feature vector B (0.8, 0.6) extracted from the image B 208 and the second feature vector B' (0.8, 0) extracted from the reconstructed image B' 210, so the detailed descriptions thereof will not be repeated.

In operation S840, the electronic device 1000 may determine an anomaly in the first image based on whether the MSE exceeds a preset third threshold. Specifically, in the disclosure, the electronic device 1000 may perform accurate anomaly detection not by directly determining an MSE between the first and second feature vectors extracted from an input first image and a second image with reconstructed features of the first image, respectively, but by filtering the first and second feature vectors using a filtering vector that has element values adjusted based on a predefined filtering rate and determining whether there is an anomaly in the first image based on an MSE between the filtered first and second feature vectors.

Figure 9:
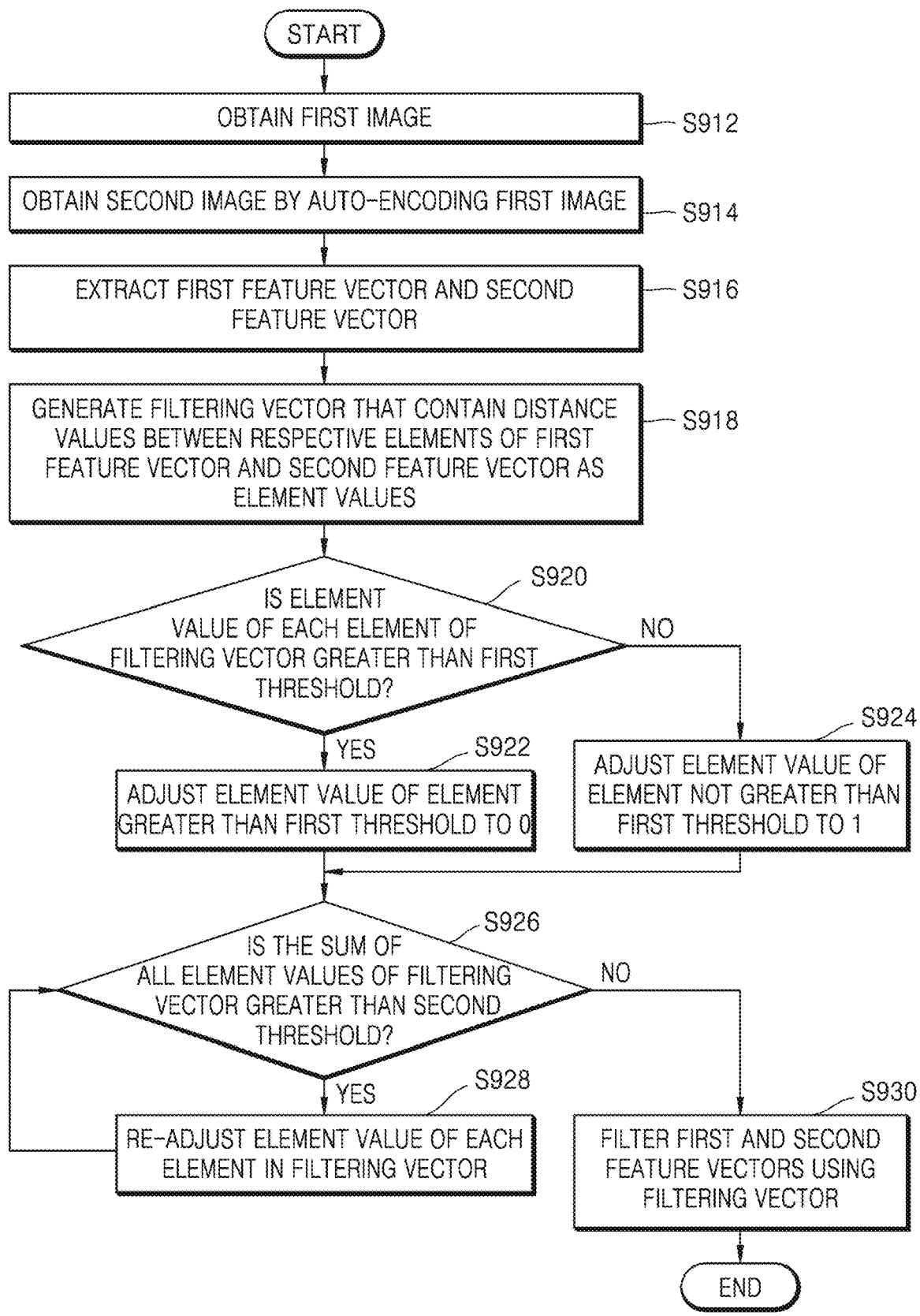
FIG. 9 illustrates a flowchart of a method by which an electronic device analyzes an image for anomaly detection, according to an embodiment of the disclosure.

FIG. 9 illustrates a flowchart of a method by which an electronic device analyzes an image for anomaly detection, according to an embodiment of the disclosure.

In operation S912, the electronic device 1000 obtains a first image. In operation S914, the electronic device 1000 obtains a second image by auto-encoding the first image. The second image may be a reconstructed image in the same dimension as the first image. The operation S914 may correspond to the procedure of FIG. 3 in which the electronic device 1000 generates the second image using the first neural network model 304, so the detailed descriptions thereof will not be repeated.

In operation S916, the electronic device 1000 extracts first and second feature vectors from the first and second images, respectively. For example, the electronic device 1000 may extract the first feature vector from the first image and the second feature vector from the second image using the second neural network model including two or more CNNs in a VGGNet structure. The operation S916 may correspond to the procedure of FIG. 3 in which the electronic device 1000 extracts the first and second feature vectors 312 and 314 using the second neural network model, so the detailed descriptions thereof will not be repeated.

In operation S918, the electronic device 1000 generates a filtering vector having distance values between the respective elements of first and second feature vectors as element values. The operation S918 may correspond to the procedure of FIG. 7 in which the electronic device 1000 generates the filtering vectors 706, 716, and 726, so the detailed descriptions thereof will not be repeated.

In operation S920, the electronic device 1000 determines whether an element value of each element in the filtering vector is greater than the first threshold. In operation S922, the electronic device 1000 adjusts those of element values of the filtering vector, which are greater than the first threshold, to 0. In operation S924, the electronic device 1000 adjusts those of element values of the filtering vector, which are not greater than the first threshold, to 1. The operation S922 or the operation S924 may correspond to the procedure of FIG. 7 in which the electronic device 1000 determines the filtering vector 707, 717, or 727, so the detailed descriptions thereof will not be repeated.

In operation S926, the electronic device 1000 determines whether the sum of all the element values in the filtering vector having adjusted to 0 or 1 based on whether the element is greater than the first threshold is greater than the second threshold. In operation S928, when the sum of all the elements in the filtering vector is greater than the second threshold, the electronic device 1000 re-adjusts an element value of each element in the filtering vector such that the sum of all the elements in the filtering vector is not greater than the second threshold. In operation S930, when the sum of all the elements in the filtering vector is not greater than the second threshold, the electronic device 1000 filters the first feature vector and the second feature vector using the filtering vector whose element values have been adjusted to 0 or 1 based on whether the element is greater than the first threshold. The electronic device 1000 may determine whether there is an anomaly in the first image based on a reconstruction error between the filtered first feature vector and the filtered second feature vector.

Figure 10:
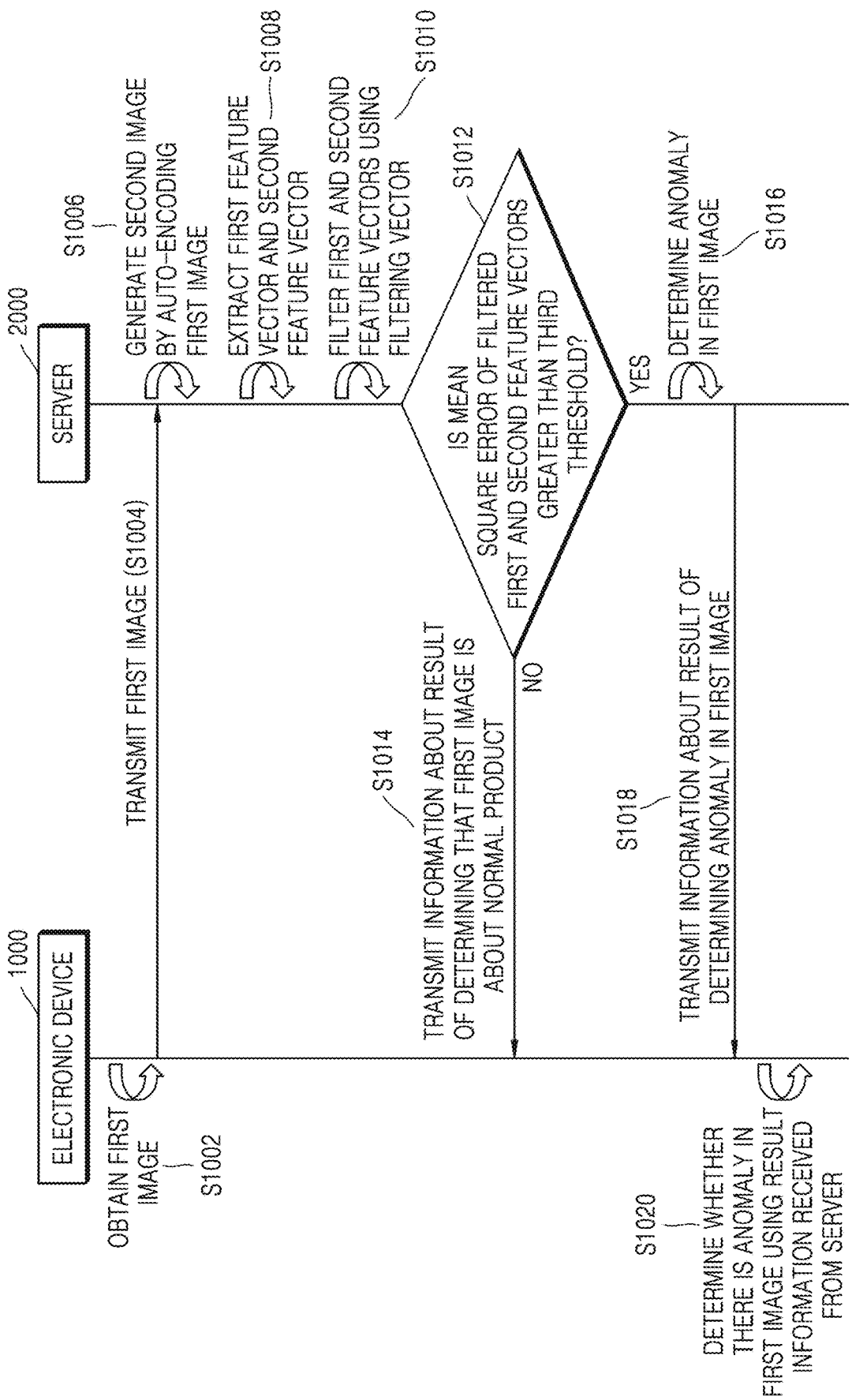
FIG. 10 illustrates a sequence diagram for describing an image analysis procedure for anomaly detection between an electronic device and a server, according to an embodiment of the disclosure.

FIG. 10 illustrates a sequence diagram for describing an image analysis procedure for anomaly detection between an electronic device and a server, according to an embodiment of the disclosure.

In an embodiment of the disclosure, the electronic device 1000 may work with a server 2000 to determine an anomaly in an input image. For example, in operation S1002, the electronic device 1000 may obtain a first image. In operation S1004, the electronic device 1000 may transmit the first image to the server 2000. In an embodiment of the disclosure, the electronic device 1000 may transmit coordinate information of pixels in the first image or information about pixel values of the pixels corresponding to the coordinate information to the server 2000.

In operation S1006, the server 2000 may generate a second image by auto-encoding the first image. For example, the server 2000 may include an auto-encoder, which is a non-supervised learning based artificial neural network model that is trained to approximate a desired output to an input, and generate the second image by auto-encoding the first image using the auto-encoder. The operation S1006 may correspond to the procedure of FIGS. 1 to 3 in which the electronic device 1000 auto-encodes the first image, so the detailed descriptions thereof will not be repeated.

In operation S1008, the server 2000 may extract a first feature vector from the first image and a second feature vector from the second image. For example, upon receiving the first image or the second image, the server 2000 may extract the first and second feature vectors from the first and second images, respectively, using a second neural network model that outputs feature values determined based on correlations between the pixel information of the first image or the second image and a preset sized kernel. The second neural network model used by the server 2000 may correspond to the second neural network model used by the electronic device 1000 in FIGS. 1 to 3.

In operation S1010, the server 2000 may filter the first and second feature vectors using a filtering vector. For example, the server 2000 may determine distance values between the respective elements of the first and second feature vectors, and determine a filtering vector that contains distance values between respective elements as element values. The server 2000 may further adjust those of element values in the filtering vector, which are greater than a preset first threshold, to 0, and those which are not greater than the first threshold to 1.

In an embodiment of the disclosure, the server 2000 may re-adjust the element values of the filtering vector based on whether the sum of all the element values in the filtering vector whose element values have been adjusted to 0 or 1 based on the first threshold is not greater than a second threshold. The server 2000 may filter the first and second feature vectors using the filtering vector with the re-adjusted element values. Methods by which the server 2000 determines a filtering vector and filters the first and second feature vectors using the filtering vector in operation S1010 may correspond to the methods by which the electronic device 1000 determines the filtering vector and filters the first and second feature vectors using the filtering vector as described above in connection with FIGS. 3 to 7, so the detailed descriptions thereof will not be repeated.

In operation S1012, the server 2000 may determine whether an MSE of filtered first feature vector and the filtered second feature vector is greater than a preset third threshold. In operation S1014, when the MSE is not greater than the third threshold, the server 2000 may transmit information about a result of determining that the first image is normal to the electronic device 1000. In operation S1016, the server 2000 may determine an anomaly in the first image when the MSE is greater than the third threshold. In operation S1018, the server 2000 may transmit the information about the result of determining that the first image has an anomaly to the electronic device 1000. In operation S1020, the electronic device 1000 may determine whether there is an anomaly in the first image using the received information about the result.

Figure 11:
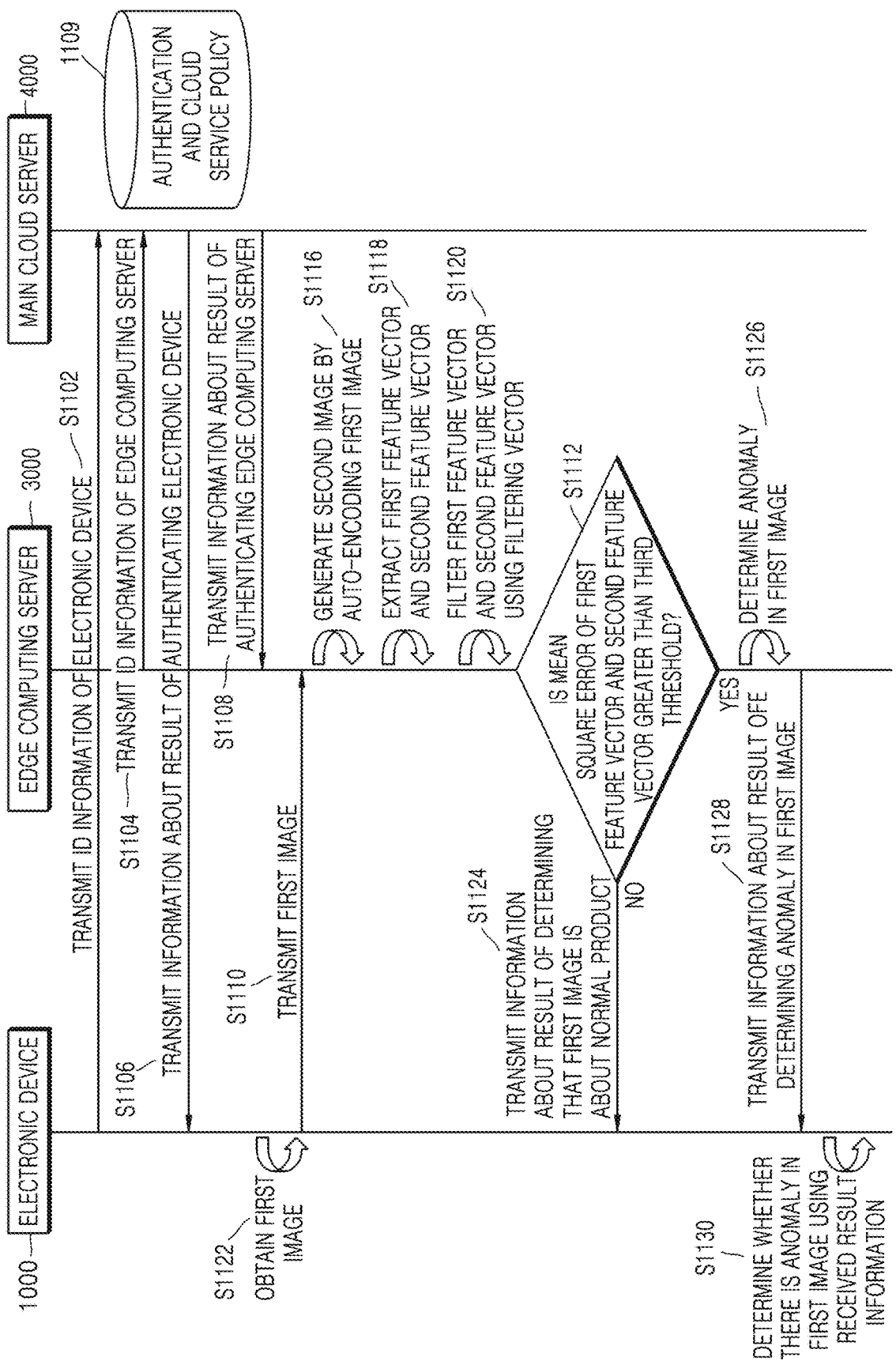
FIG. 11 illustrates a sequence diagram for describing a procedure of performing an image analysis method for anomaly detection between an electronic device, an edge computing server, and a main cloud server, according to an embodiment of the disclosure.

FIG. 11 is a sequence diagram for describing a procedure of performing an image analysis method for anomaly detection between an electronic device, an edge computing server, and a main cloud server, according to an embodiment of the disclosure.

In an embodiment of the disclosure, the electronic device 1000 may obtain a first image, and determine whether there is an anomaly in the first image by transmitting the first image to an edge computing server 3000. For example, the electronic device 1000 may detect an anomaly in the first image using a main cloud server 4000 for providing a cloud computing service and the edge computing server 3000 that is able to quickly process a request about image data from the electronic device 1000 in a local smart factory using an edge computing technology.

For example, the main cloud server 4000 may control the electronic device 1000 and the edge computing server 3000 to provide a cloud service. The main cloud server 4000 may store authentication information for authenticating the electronic device 1000 and the edge computing server 3000 and information about a plurality of cloud service policies to provide a cloud service using an authenticated electronic device and edge computing server in a database 1109. The edge computing server 3000 provides a cloud service for a localized image anomaly detection. The edge computing server 3000 may process information about an image obtained from the electronic device 1000 and information about an image analysis result locally, which makes it separated regionally from the cloud server, thereby guaranteeing security of the information about the image obtained by the electronic device 1000 unlike when a centralized server is used.

For example, in operation S1102, the electronic device 1000 transmits identification (ID) information of the electronic device 1000 to the main cloud server 4000. The ID information of the electronic device 1000 may include information required to identify the electronic device 1000, such as a media access control (MAC) address of the electronic device 1000. In operation S1104, the edge computing server 3000 transmits ID information of the edge computing server 3000 to the main cloud server 4000. The ID information of the edge computing server 3000 may include information required to identify the edge computing server 3000. In operation S1106, the main cloud server 4000 transmits information about a result of authenticating the electronic device 1000 to the electronic device 1000. In operation S1108, the main cloud server 4000 transmits information about a result of authenticating the edge computing server 3000 to the edge computing server 3000. The electronic device 1000 may complete a preparation process for an image analysis procedure using an edge computing technology by completing the authentication procedure between the edge computing server 3000 and the main cloud server 4000.

In operation S1112, the electronic device 1000 may obtain a first image. In operation S1110, the electronic device 1000 may transmit the first image to the edge computing server 3000. In an embodiment of the disclosure, the electronic device 1000 may transmit coordinate information of pixels in the first image or information about pixel values of the pixels corresponding to the coordinate information to the edge computing server 3000.

In operation S1116, the edge computing server 3000 may generate a second image by auto-encoding the first image. The procedure in which the edge computing server 3000 generates the second image by auto-encoding the first image may correspond to the procedure of FIGS. 1 to 3 in which the electronic device 1000 auto-encodes the first image, so the detailed descriptions thereof will not be repeated.

In operation S1118, the edge computing server 3000 may extract a first feature vector from the first image and a second feature vector from the second image. For example, upon receiving the first image or the second image, the edge computing server 3000 may extract the first and second feature vectors from the first and second images, respectively, using a second neural network model that outputs feature values determined based on correlations between the pixel information of the first image or the second image and a preset sized kernel. The second neural network model used by the edge computing server 3000 may correspond to the second neural network model used by the electronic device 1000 in FIGS. 1 to 3.

In operation S1120, the edge computing server 3000 may filter the first and second feature vectors using a filtering vector. The operation of the edge computing server 3000 filtering the first and second feature vectors using the filtering vector may correspond to the operation S1010 performed by the server 2000 of FIG. 10, so the detailed descriptions thereof will not be repeated.

In operation S1122, the edge computing server 3000 may determine whether an MSE of filtered first feature vector and the filtered second feature vector is greater than a preset third threshold. The operation S1122 may correspond to the operation S1012 of FIG. 10, so the detailed descriptions thereof will not be repeated. In operation S1124, when the MSE is not greater than the third threshold, the edge computing server 3000 may transmit information about a result of determining that the first image is normal to the electronic device 1000. On the other hand, in operation S1126, the edge computing server 3000 may determine an anomaly in the first image when the MSE is greater than the third threshold. In operation S1128, the edge computing server 3000 may transmit information about a result of an anomaly in the first image to the electronic device 1000. In operation S1130, the electronic device 1000 may determine and output whether there is an anomaly in the first image using the received information about the result.

In other words, the electronic device 1000 may receive a localized image analysis result using the main cloud server 4000 for providing a cloud service and the edge computing server 3000 connected to the main cloud server 4000 and the electronic device 1000.

Figure 12:
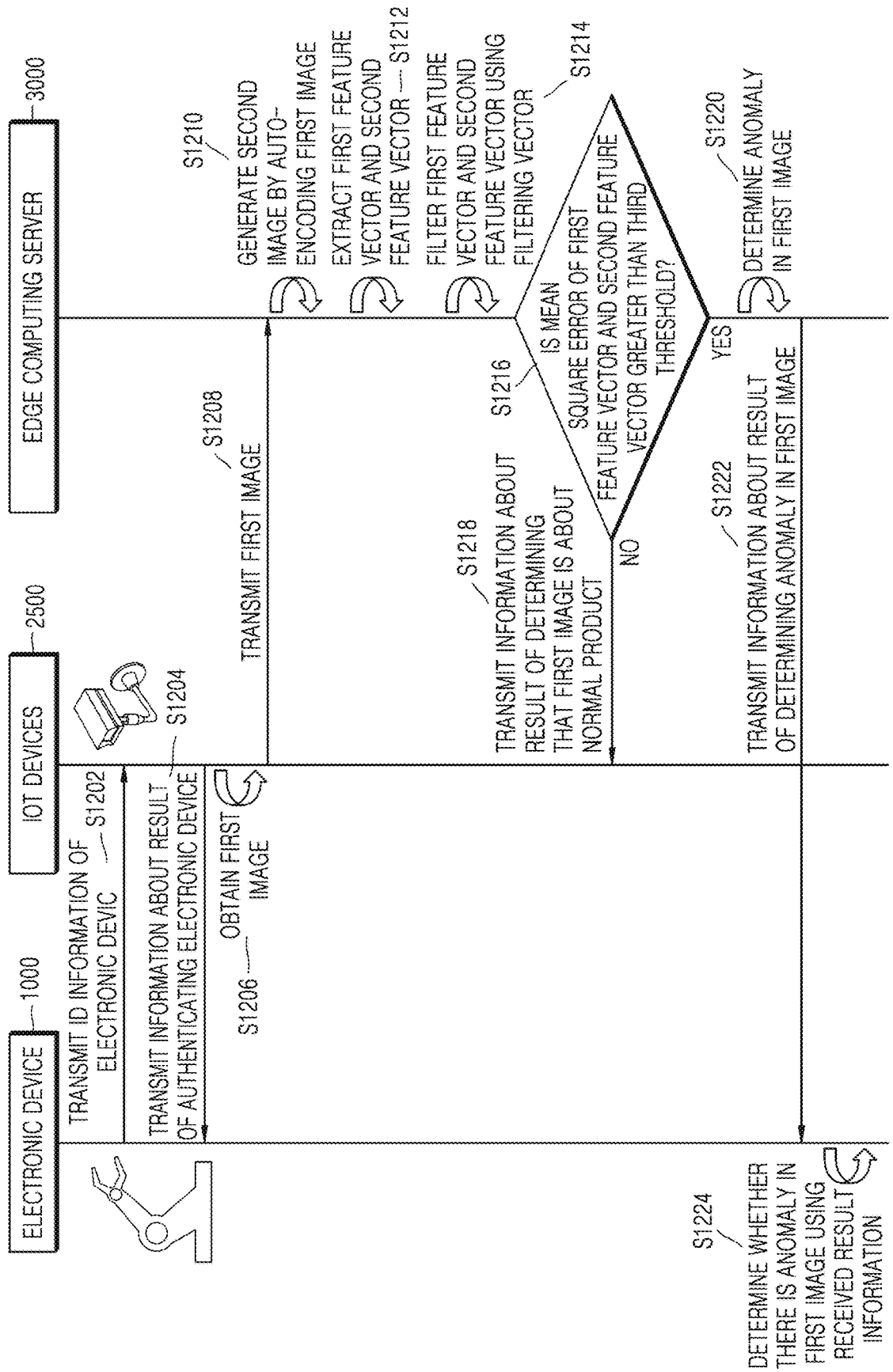
FIG. 12 illustrates a sequence diagram for describing a procedure of performing an image analysis method for anomaly detection between an electronic device, Internet of Things (IoT) devices, and an edge computing server, according to an embodiment of the disclosure.

FIG. 12 illustrates a sequence diagram for describing a procedure of performing an image analysis method for anomaly detection between an electronic device, Internet of Things (IoT) devices, and an edge computing server, according to an embodiment of the disclosure.

In an embodiment of the disclosure, the electronic device 1000 may be connected to a plurality of IoT devices by wire or wirelessly. Assuming that the electronic device 1000 is located in a smart factory where an automated product manufacturing process is performed, the electronic device 1000 may be connected to one or more IoT devices 2500 that obtain image signals, video signals, or audio signals of products manufactured in the smart factory. The IoT devices 2500 may be unmanned surveillance cameras for examining the products.

The one or more IoT devices 2500 may include at least one of an image sensor for obtaining an image signal of a product manufactured, a video sensor for obtaining a video signal of a product manufactured, or an audio sensor for obtaining an audio signal of a product manufactured. Furthermore, the one or more IoT devices 2500 may be in close proximity to the electronic device 1000 and coupled to the edge computing server 3000 for performing a localized anomaly detection method. A procedure in which the edge computing server 3000 and a main cloud server 4000 exchange authentication information and authentication results is the same as what is shown in FIG. 11, so the detailed descriptions thereof will not be repeated in FIG. 12.

In operation S1202, the electronic device 1000 may transmit ID information of the electronic device 1000 to the IoT devices 2500. In operation S1204, the IoT devices 2500 may complete the procedure of working with the electronic device 1000 by transmitting information about a result of authenticating the electronic device 1000 to the electronic device 1000. In operation S1206, the IoT devices 2500 may obtain a first image about a product. In operation S1208, the IoT devices 2500 may transmit the first image to the edge computing server 3000. The operation S1208 may correspond to the operation S1110 of FIG. 11.

In operation S1210, the edge computing server 3000 may generate a second image by auto-encoding the first image. The operation of the edge computing server 3000 generating the second image by auto-encoding the first image may correspond to the operation S1116 of FIG. 11. In operation S1212, the edge computing server 3000 may extract a first feature vector from the first image and a second feature vector from the second image. The operation S1212 may correspond to the operation S1118 of FIG. 11, so the detailed descriptions thereof will not be repeated.

In operation S1214, the edge computing server 3000 may filter the first and second feature vectors using a filtering vector. The operation S1214 may correspond to the operation S1120 of FIG. 11, so the detailed descriptions thereof will not be repeated. In operation S1216, the edge computing server 3000 may determine whether an MSE of the filtered first feature vector and the filtered second feature vector is greater than a preset third threshold. The operation S1216 may correspond to the operation S1122 of FIG. 11, so the detailed descriptions thereof will not be repeated.

In operation S1218, when the MSE is not greater than the third threshold, the edge computing server 3000 may transmit information about a result of determining that the first image is normal to the electronic device 1000. On the other hand, in operation S1220, the edge computing server 3000 may determine an anomaly in the first image when the MSE is greater than the third threshold. In operation S1222, the edge computing server 3000 may transmit information about the result of an anomaly in the first image to the electronic device 1000. In operation S1224, the electronic device 1000 may determine and output whether there is an anomaly in the first image using the received information about the result.

In other words, the electronic device 1000 may work with one or more IoT devices 2500 that are able to obtain an image or video about a product, in addition to the edge computing server 3000 and the main cloud server 4000, to determine whether there is an anomaly in the first image.

Figure 13:
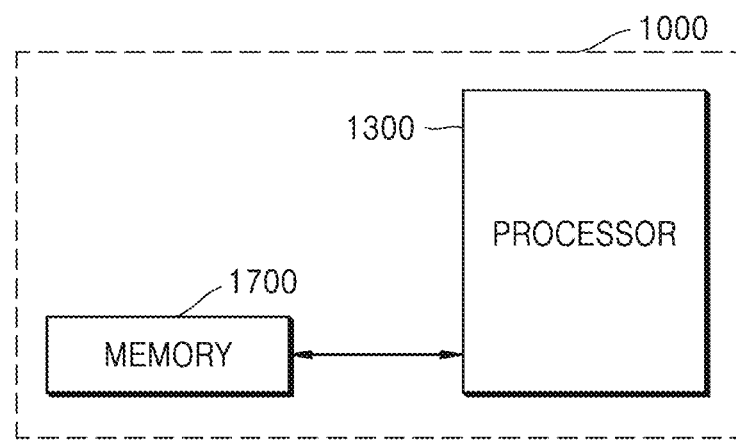
FIG. 13 illustrates a block diagram of an electronic device for analyzing an image, according to an embodiment of the disclosure.

FIG. 13 illustrates a block diagram of an electronic device for analyzing an image, according to an embodiment of the disclosure.

Figure 14:
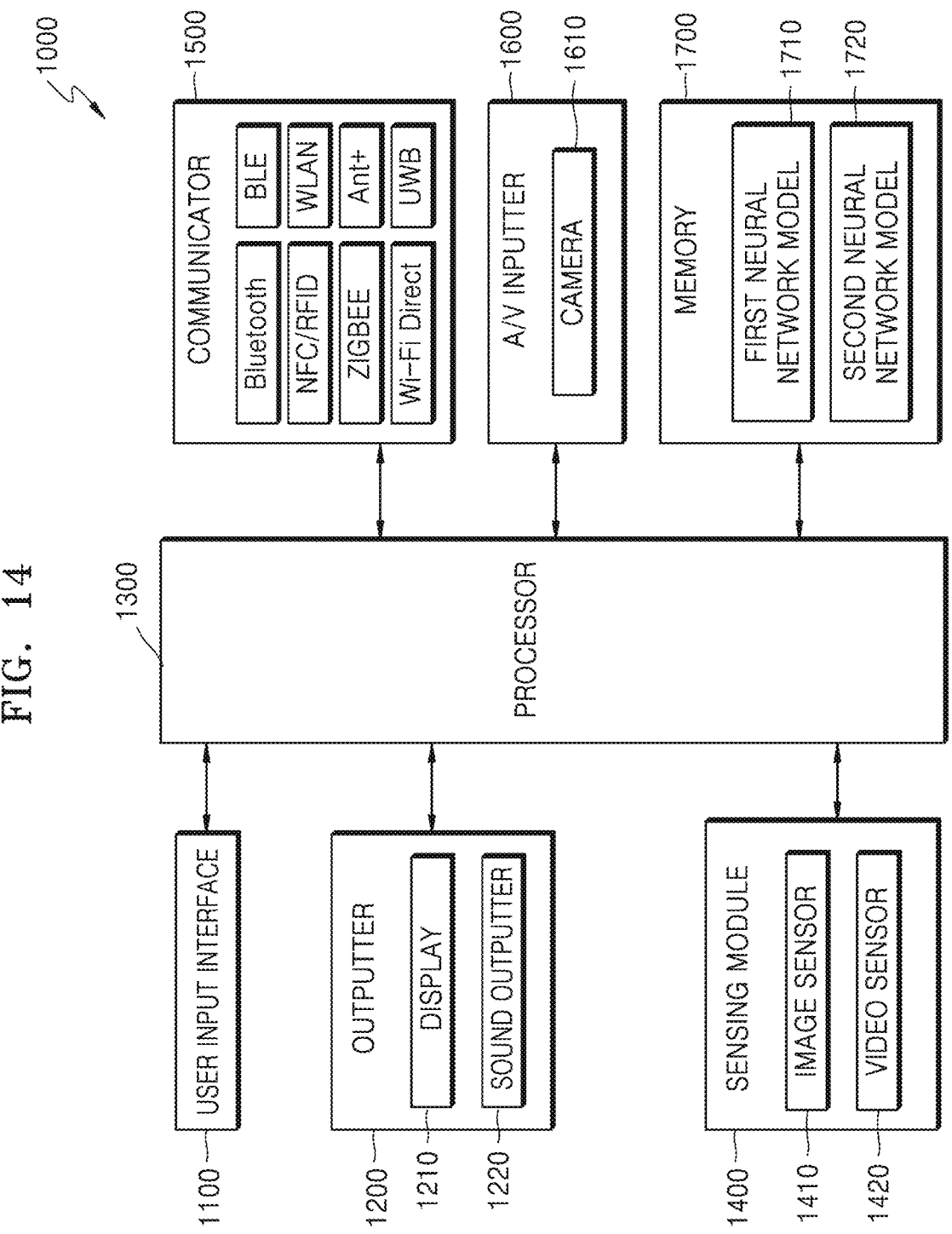
FIG. 14 illustrates a block diagram of an electronic device for analyzing an image, according to another embodiment of the disclosure.

FIG. 14 illustrates a block diagram of an electronic device for analyzing an image, according to another embodiment of the disclosure.

Referring to FIG. 13, in an embodiment of the disclosure, the electronic device 1000 may include a processor 1300 and a memory 1700. However, not all the illustrated components are essential. The electronic device 1000 may be implemented with more or fewer components than illustrated ones.

For example, as shown in FIG. 14, the electronic device 1000 in an embodiment of the disclosure may further include a user input interface 1100, an outputter 1200, a sensing module 1400, a communicator 1500 (such as a transceiver), and an audio/video (A/V) inputter 1600, in addition to the processor 1300 and the memory 1700. The components of the electronic device 1000 will now be described in detail.

The user input interface 1100 may receive user inputs from a user of the electronic device 1000. For example, the user input interface 1100 may receive user inputs from the user to determine the first threshold, the second threshold, the third threshold, or the filtering rate. For example, the user input interface 1100 may include a key pad, a dome switch, a (capacitive, resistive, infrared detection type, surface acoustic wave type, integral strain gauge type, piezoelectric effect type) touch pad, a jog wheel, a jog switch, etc., without being limited thereto.

An outputter 1200 for outputting audio or video signals may include a display 1210, a sound outputter 1220, etc. For example, the display 1210 may output information about a result of whether there is an anomaly in the first image. Furthermore, the display 1210 may output information about the first threshold set by the user in advance to adjust element values of the filtering vector to 0 or 1 or the second threshold to re-adjust the element values of the filtering vector.

The sound outputter 1220 outputs audio data received from the communicator 1500 or stored in the memory 1700. The sound outputter 1220 also outputs sound signals related to a function being performed in the electronic device 1000. The sound outputter 1220 may include a speaker, buzzer, etc. Moreover, in an embodiment of the disclosure, the sound outputter 1220 may output a notification sound when the electronic device 1000 detects an anomaly in the first image.

The sensing module 1400 may include an image sensor 1410 and a video sensor 1420, without being limited thereto. Those of ordinary skill in the art may intuitively infer the functions of the respective sensors, so the detailed descriptions thereof will be omitted.

The processor 1300 controls general operation of the electronic device 1000. For example, the processor 1300 may execute programs stored in the memory 1700 to generally control the outputter 1200, the sensing module 1400, the communicator 1500, the A/V inputter 1600, the user input interface 1100, the memory 1700, etc. The processor 1300 may include one or more processors, and the processor may be a universal processor such as a central processing unit (CPU), an application processor (AP), a digital signal processor (DSP), etc., a dedicated graphic processor such as a graphics processing unit (GP), a vision processing unit (VPU), etc., or a dedicated artificial intelligence (AI) processor such as a neural processing unit (NPU).

In an embodiment of the disclosure, when the processor 1300 includes the universal processor, the AI processor, and the dedicated graphic processor, the AI processor may be implemented in a separate chip from the universal processor or the dedicated graphic processor. For example, the one or more processors may control processing of input data according to a predefined operation rule or an AI model stored in the memory. When the one or more processors are the dedicated AI processors, they may be designed in a hardware structure that is specific to dealing with a particular AI model.

In an embodiment of the disclosure, when the processor 1300 is implemented with a plurality of processors, a dedicated graphic processor, or a dedicated AI processor such as an NPU, at least some of the plurality of processors, the dedicated graphic processor or the dedicated AI processor such as an NPU may be installed in the electronic device 1000 and another electronic device or a server connected to the electronic device 1000.

In an embodiment of the disclosure, the processor 1300 obtains information about a first image from the image sensor 1410 of the sensing module 1400. The processor 1300 may generate a second image by auto-encoding the first image using a first neural network model 1710 stored in the memory 1700, and extract first and second feature vectors from the first and second images, respectively, using a second neural network model 1720 stored in the memory 1700.

In another embodiment of the disclosure, the processor 1300 may obtain a video signal about a product from the video sensor 1420. The processor 1300 may extract an image per frame in the video signal, generate a reconstructed image by auto-encoding the extracted image, and determine whether there is an anomaly in the extracted image based on a reconstruction error between the extracted image and the reconstructed image.

In an embodiment of the disclosure, the processor 1300 may filter each of the first and second feature vectors using a filtering vector generated based on distance values between the respective elements of the extracted first and second feature vectors. In an embodiment of the disclosure, a method by which the processor 1300 generates the filtering vector based on distance values between the respective elements of the first and second feature vectors may correspond to the method of FIG. 7 by which the electronic device 1000 determines the filtering vector 707, the filtering vector 714, and the filtering vector 727, so the detailed descriptions thereof will not be repeated.

For example, upon reception of the first image, the processor 1300 may generate the second image using the first neural network model that reconstructs the first image by encoding the first image and decoding the encoded first image.

In an embodiment of the disclosure, upon receiving the first image or the second image, the processor 1300 may extract first and second feature vectors using the second neural network model 1720 that outputs feature values determined based on correlations between pixel information of the first image or the second image and a preset sized kernel.

In an embodiment of the disclosure, the processor 1300 may generate a filtering vector that has distance values between the respective elements of the first and second feature vectors as element values, and adjust the element values in the filtering vector to 0 or 1 based on whether the element values of the elements in the filtering vector are greater than the first threshold. In an embodiment of the disclosure, the processor 1300 may re-adjust the element values of the filtering vector, which have been adjusted to 0 or 1, when the sum of all the element values in the filtering vector is not greater than the second threshold.

In an embodiment of the disclosure, the processor 1300 may filter the first and second feature vectors through element-wise multiplication of each of the first and second feature vectors by the filtering vector. For example, the processor 1300 may determine an MSE of the filtered first and second feature vectors, and determine whether there is an anomaly in the first image based on whether the MSE is greater than the third threshold.

The processor 1300 may output the determined information about whether there is an anomaly in the first image to the display 1210 or the sound outputter 1220. For example, when no anomaly is detected in the first image, the processor 1300 may output text information such as 'it is about a normal product' through the display 1210. Furthermore, when an anomaly is detected in the first image, the processor 1300 may output text information such as 'it is about a defective product' through the display 1210.

In an embodiment of the disclosure, when no anomaly is detected in the first image, the processor 1300 may output voice information such as 'it is about a normal product' through the sound outputter 1220. Furthermore, when an anomaly is detected in the first image, the processor 1300 may output voice information such as 'it is about a defective product' through the sound outputter 1220.

In an embodiment of the disclosure, the electronic device 1000 may perform, of operations of the electronic device 1000 using a universal processor, an operation of obtaining an image, an operation of outputting information about a result of whether there is an anomaly in the first image, an operation of auto-encoding the first image using an AI model with an AI processor, and an operation of extracting the first and second feature vectors from the first image and the second image generated by auto-encoding the first image, respectively, without being limited thereto. That is, in performing the image analysis method for efficient anomaly detection, the electronic device 1000 may determine required processing resources, and use at least one of the universal processor, the dedicated graphic processor, or the AI processor based on the determined processing resources.

In an embodiment of the disclosure, the predefined operation rule or the AI model by which the electronic device 1000 is operated is characterized by being made through learning. Specifically, the predefined operation rule or the AI model being made through learning refers to the predefined operation rule or the AI model established to perform a desired feature (or an object) being made when a basic AI model is trained by a learning algorithm with a lot of training data. Such learning may be performed by a device itself in which AI is performed according to the disclosure, or by a separate server and/or system. Examples of the learning algorithm may include supervised learning, unsupervised learning, semi-supervised learning, or reinforcement learning, without being limited thereto.

For example, the processor 1300 may obtain training data for training the AI model from an input device in the electronic device 1000 or an external device that may communicate with the electronic device 1000. For example, the processor 1300 may obtain image data to train the first neural network model or the second neural network model from the input device in the electronic device 1000 or the external device that may communicate with the electronic device 1000.

In an embodiment of the disclosure, the processor 1300 may pre-process the data obtained for training the AI model. For example, the processor 1300 may process the obtained data in a preset format. In an embodiment of the disclosure, the processor 1300 may select training data for training the AI model based on a preset criterion (e.g., a region where the training data is generated, a time at which the training data is generated, a size of the training data, a genre of the training data, a generator of the training data, a type of an object in the training data, etc.), and even generate a rule and a model to select the criterion for selecting the training data for training the AI model.

For example, the artificial neural network model used by the electronic device 1000 may include a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by results of training the artificial neural network model. For example, the plurality of weight values may be updated to reduce or minimize a loss value or a cost value obtained by the AI model during a training procedure. The artificial neural network may include, for example, a CNN, a DNN, an RNN, an RBM, a DBN, a BRDNN, or a deep Q-network, without being limited thereto.

The communicator 1500 may include one or more components that enable communication between the electronic device 1000 and the server 2000 or another electronic device that may communicate with the electronic device 1000. For example, the communicator 1500 may include a Bluetooth communicator, a Bluetooth low energy (BLE) communicator, a near field communication (NFC) module, a wireless local area network (WLAN), e.g., Wi-Fi, communicator, a Zigbee communicator, an infrared data association (IrDA) communicator, a Wi-Fi direct (WFD) communicator, an ultra-wide band (UWB) communicator, an Ant+ communicator, etc., without being limited thereto.

In an embodiment of the disclosure, the communicator 1500 may transmit information about the first image to the server 2000, or receive information about a result of whether there is an anomaly in the first image determined by the server 2000. Furthermore, the communicator 1500 may transmit ID information of the electronic device 1000 to the main cloud server 4000, or receive information about a result of authenticating the electronic device 1000 from the main cloud server 4000. Moreover, the communicator 1500 may transmit the first image to the edge computing server 3000, or receive information about whether there is an anomaly in the first image from the edge computing server 3000.

In an embodiment of the disclosure, the communicator 1500 may transmit ID information of the electronic device 1000 to the IoT devices 2500 connected to the electronic device 1000 by wire or wirelessly, or receive information about a result of authenticating the electronic device 1000 from the IoT devices 2500.

The A/V inputter 1600 may include a camera 1610 for receiving a video signal input. The camera 1610 may obtain image frames, such as still images or video through an image sensor in a video call mode or a photography mode. An image captured by the image sensor may be processed by the processor 1300 or an extra image processor (not shown). Image frames processed by the camera 1610 may be stored in the memory 1700, or transmitted to an outside via the communicator 1500. In an embodiment of the disclosure, the camera 1610 may include at least one of a telecamera, a wide angle camera, or a common camera, without being limited thereto.

The memory 1700 may store programs for processing and controlling of the processor 1300, and also store input/output data (e.g., the first neural network model, the second neural network model, image data for training the first and second neural network models, etc.).

The memory 1700 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

Figure 15:
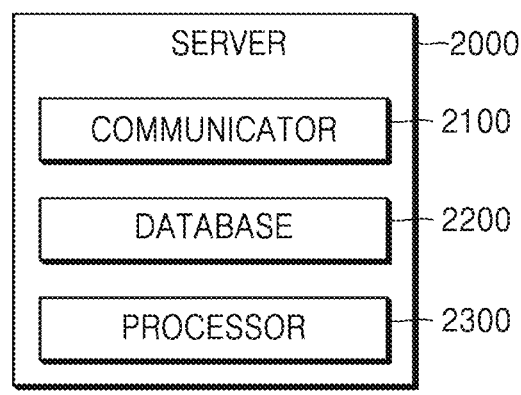
FIG. 15 illustrates a block diagram of a server for performing a method of analyzing an image, according to an embodiment of the disclosure.

FIG. 15 illustrates a block diagram of a server for performing a method of analyzing an image, according to an embodiment of the disclosure.

In an embodiment of the disclosure, the server 2000 may include a communicator 2100 (such as a transceiver), a database 2200, and a processor 2300. However, not all the illustrated components are essential. The server 2000 may be implemented with more or fewer components than the illustrated ones. In an embodiment of the disclosure, the server 2000 may include all the components of the electronic device 1000 as shown in FIG. 14. Furthermore, the communicator 2100, the database 2200, and the processor 2300 in the server 2000 according to the disclosure may be included in the edge computing server 3000 or the main cloud server 4000 for providing a cloud based image anomaly detection service.

For example, using one or more communication devices, the communicator 2100 may receive information about the first image from the electronic device 1000 or transmit information about a result of whether there is an anomaly in the first image determined by the server 2000 to the electronic device 1000. Furthermore, to provide a service for detecting an anomaly in a cloud based image by working with the electronic device 1000 or another server (e.g., an edge computing server or a main cloud server), the communicator 2100 may receive ID information from the electronic device 1000 or transmit ID information of the server 2000 itself to another server. The communicator 2100 may correspond to the communicator 1500 of the electronic device as shown in FIG. 14, so the detailed descriptions thereof will not be repeated.

The database 2200 may store programs for processing and controlling of the processor 2300, and also store input/output data (e.g., the first neural network model, the second neural network model, image data for training the first and second neural network models, etc.). Furthermore, the database 2200 may further store authentication information for authenticating the electronic device 1000 and the edge computing server 3000 and information about a plurality of cloud service policies to provide a cloud service using an authenticated electronic device and edge computing server. The database 2200 may correspond to the memory 1700 of the electronic device 1000 of FIG. 14, so the detailed descriptions thereof will not be repeated.

The processor 2300 may generate a second image by auto-encoding the first image received from the electronic device 1000. For example, upon reception of the first image, the processor 2300 may generate the second image using the first neural network model that reconstructs the first image by encoding the first image using the first neural network model stored in the database 2200 and decoding the encoded first image.

In an embodiment of the disclosure, upon receiving the first image or the second image, the processor 2300 may extract first and second feature vectors using the second neural network model stored in the database 2200, which outputs feature values determined based on correlations between pixel information of the first image or the second image and a preset sized kernel.

In an embodiment of the disclosure, the processor 2300 may filter each of the first and second feature vectors using a filtering vector generated based on distance values between the respective elements of the first and second feature vectors, and determine whether there is an anomaly in the first image based on distance values between the respective elements of the filtered first and second feature vectors.

Furthermore, the processor 2300 may transmit information about whether there is an anomaly in the first image to the electronic device 1000 or another server by controlling the communicator 2100. Moreover, in a case of performing an image anomaly detection method through a cloud service, the processor 2300 may control the communicator 2100 to transmit or receive image information and information about a result of analyzing the image information to or from another server (e.g., an edge computing server or a main cloud server) connected to the server 2000. The processor 2300 may correspond to the processor 1300 of the electronic device 1000 of FIG. 12, so the detailed descriptions thereof will not be repeated.

Figure 16:
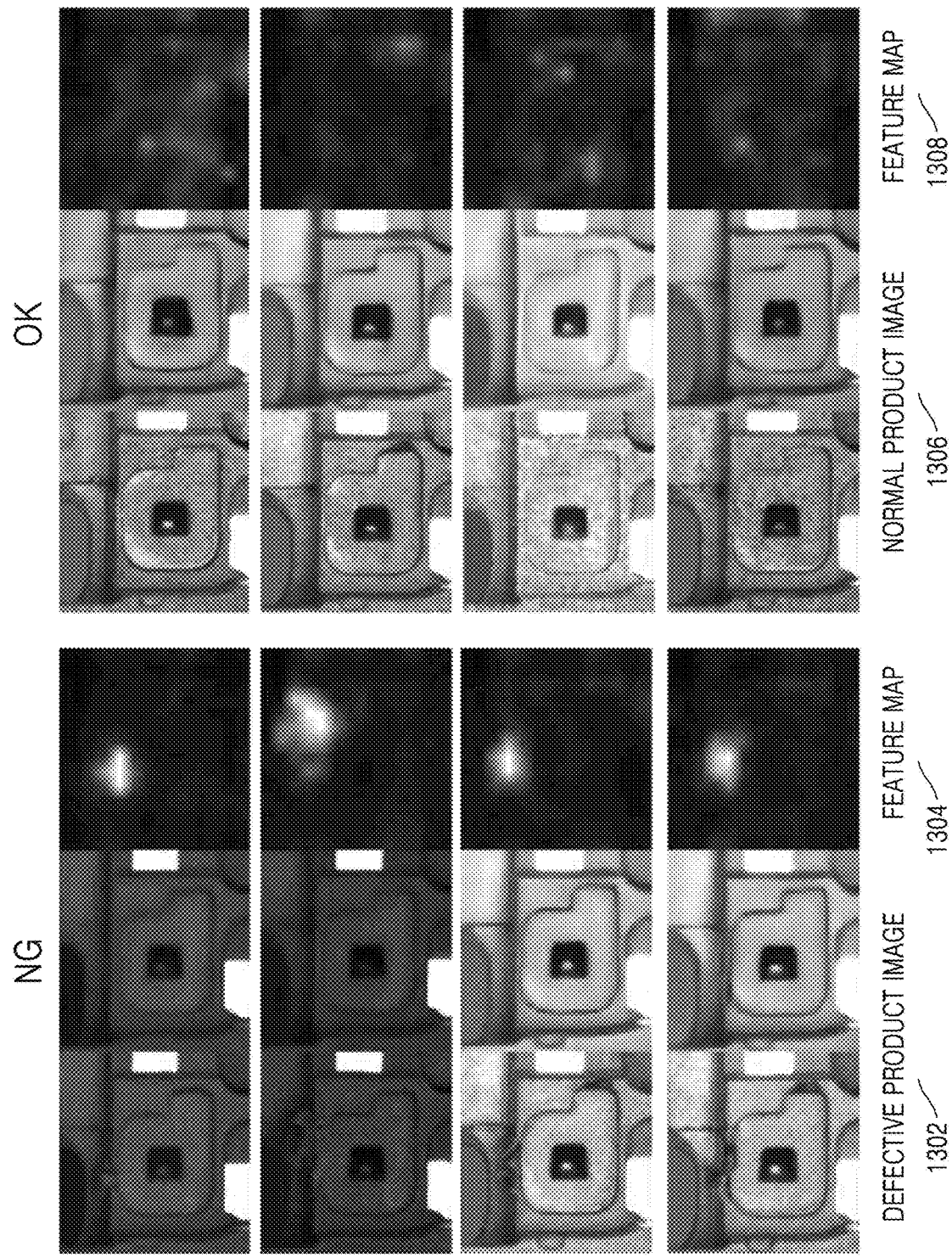
FIG. 16 illustrates a diagram for describing normal product images and defective product images to be analyzed by an electronic device, according to an embodiment of the disclosure.

FIG. 16 illustrates a diagram for describing normal product images and defective product images to be analyzed by an electronic device, according to an embodiment of the disclosure.

In an embodiment of the disclosure, the electronic device 1000 for image analysis may be used for image analysis of a wafer produced in a manufacturing process of a semiconductor device to detect an anomaly in the wafer. Referring to FIG. 14, the electronic device 1000 may classify obtained images into defective product images 1302 or normal product images 1306 based on whether there is an anomaly in the image by performing an image analysis method for anomaly detection as described above in connection with FIGS. 1 to 12. Furthermore, upon reception of an image, the electronic device 1000 may output a feature map 1304 of the defective product image 1302 and a feature map 1308 of the normal product image 1306 using a second neural network model that outputs feature values based on correlations between pixel information of the image and a preset sized kernel.

Figure 17:
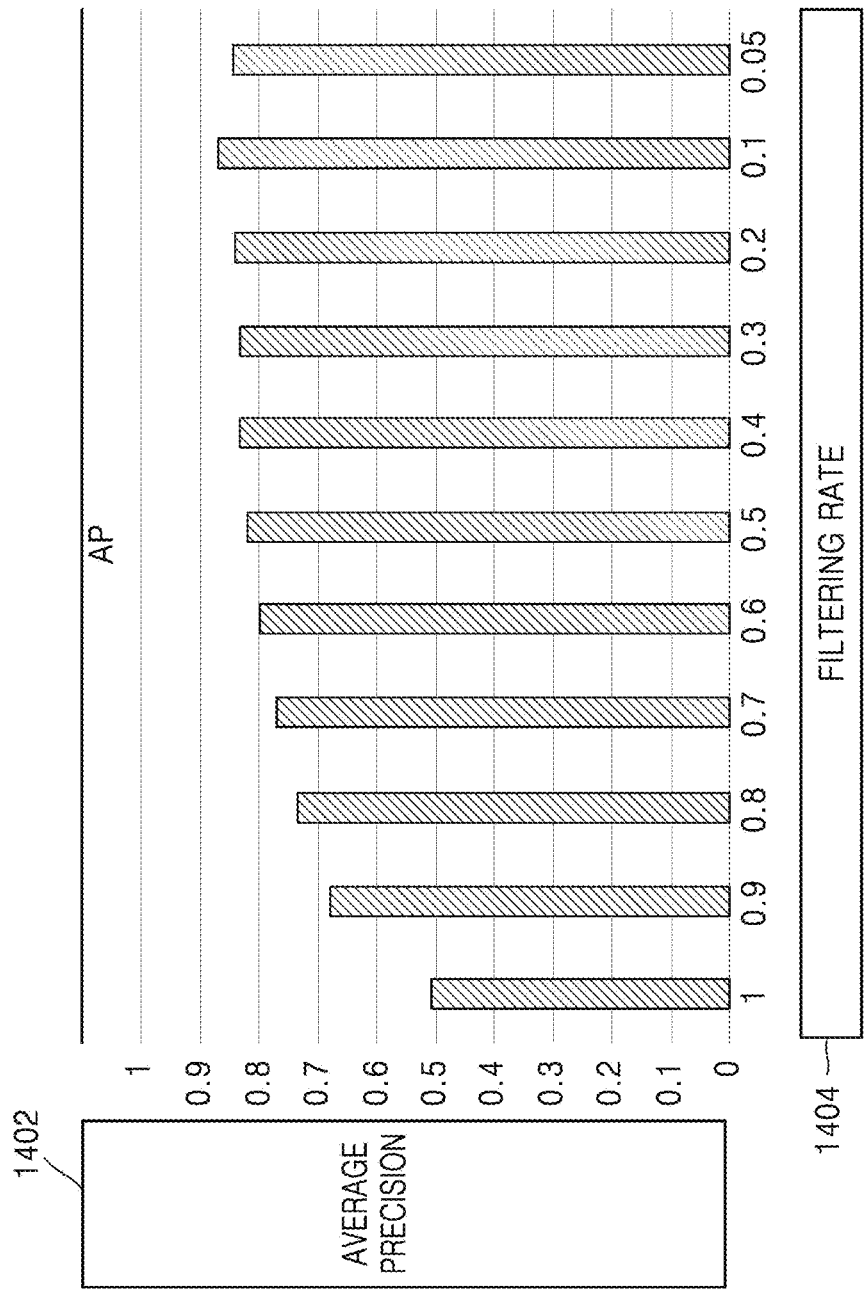
FIG. 17 illustrates a chart for describing average precision representing how accurately an electronic device determines an anomaly in an image.

FIG. 17 illustrates a chart for describing average precision representing how accurately an electronic device determines an anomaly in an image.

In an embodiment of the disclosure, average precision 1402 may represent a probability of the electronic device 1000 determining an image about a normal product as an image about a normal product or determining an image about a defective product as an image about a defective product. In other words, the average precision 1402 may stochastically represent how accurately the electronic device 1000 performs anomaly detection.

In an embodiment of the disclosure, the average precision 1402 may vary depending on a filtering rate 1404 of a filtering vector used by the electronic device 1000 to eliminate at least one element value in the first and second feature vectors.

For example, the electronic device 1000 may generate the filtering vector based on distance values between the respective elements of the first and second feature vectors, and adjust those of the element values of the filtering vector, which are greater than the first threshold, to 0 and those which are not greater than the first threshold, to 1, thereby obtaining a filtering vector containing elements with element values 0 or 1. In an embodiment of the disclosure, the electronic device 1000 may determine the filtering rate 1404 about a rate of the number of elements with element values of 1 among all the elements in the filtering vector, and re-adjust the element values in the filtering vector having been adjusted to 0 or 1 based on the filtering rate 1404.

For example, when the electronic device 1000 determines the filtering rate 1404 to be '1', all the elements in the filtering vector may have element values of 1. When the electronic device 1000 filters the first and second feature vectors using the filtering vector with all elements having the element value '1', the element values of the first and second feature vectors are not filtered, so the average precision may be '0.5'.

In an embodiment of the disclosure, when the electronic device 1000 sets the filtering rate 1404 to 0.6, element values of 1 may account for 60% and element values of 0 may account for 40% of all the element values in the filtering vector. When the electronic device 1000 filters the first and second feature vectors using the filtering vector with the filtering rate set to 0.6, the element values of the first and second feature vectors may be filtered with 40% probability.

Referring to FIG. 17, as the electronic device 1000 sets the filtering rate 1404 to be nearer to 0.1, it may be seen that the filtering rate of element values in the filtered first and second feature vectors may increase so that the average precision of the electronic device 1000 is improved. On the other hand, when the electronic device 1000 sets the filtering rate 1404 to be lower than 0.1, element values in the filtered first and second feature vectors may be excessively filtered, making it fail to secure a discriminating MSE, and thus the average precision of the electronic device 1000 may decrease again.

In an embodiment of the disclosure, the image analysis method for anomaly detection, which is performed by the electronic device 1000, may be implemented in program instructions which are executed by various computing devices and recorded in computer-readable media. The computer-readable media may include program instructions, data files, data structures, etc., separately or in combination. The program instructions recorded on the computer-readable media may be designed and configured specially for the disclosure, or may be well-known to those of ordinary skill in the art of computer software. Furthermore, in an embodiment of the disclosure, a computer program device including a recording medium that stores a program allowing the electronic device 1000 to perform the image analysis method may be provided.

The method according to the embodiments of the disclosure may be implemented in program instructions which are executable by various computing means and recorded in computer-readable media. The computer-readable media may include program instructions, data files, data structures, etc., separately or in combination. The program instructions recorded on the computer-readable media may be designed and configured specially for the disclosure, or may be well-known to those of ordinary skill in the art of computer software. Examples of the computer readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the program instructions include not only machine codes made by a compiler but also high-level language codes which are executable by various computing means using an interpreter.

Furthermore, some embodiments of the disclosure may be implemented in a computer program or a computer program product including computer-executable instructions.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by an electronic device, of analyzing an image, the method comprising:
   obtaining a first image;
   generating a second image by auto-encoding the first image;
   extracting first and second feature vectors from the first and second images, respectively;
   filtering each of the first and second feature vectors by using a filtering vector generated based on first distance values between first respective elements of the first and second feature vectors; and
   determining whether there is an anomaly in the first image based on second distance values between second respective elements of the filtered first and second feature vectors.

2. The method of claim 1, wherein the generating the second image comprises, upon receiving the first image, generating the second image using a first neural network model that reconstructs the first image by encoding the first image and decoding the encoded first image.

3. The method of claim 1, wherein the extracting the first and second feature vectors comprises, upon receiving the first image or the second image, extracting the first and second feature vectors by using a second neural network model that outputs feature values determined based on correlations between pixel information of the first image or the second image and a preset sized kernel.

4. The method of claim 1, wherein the filtering the each of the first and second feature vectors comprises:
determining a filtering vector of same dimension as the first and second feature vectors based on the first distance values between the first respective elements of the first and second feature vectors; and
performing element-wise multiplication of the first and second feature vectors by the filtering vector.

5. The method of claim 4, wherein the determining the filtering vector comprises:
generating the filtering vector to contain the first distance values between the first respective elements of the first and second feature vectors as element values of the filtering vector;
adjusting the element values of the filtering vector based on whether each of the element values of the filtering vector is greater than a preset first threshold; and
determining the filtering vector to contain the adjusted element values as the element values of the filtering vector.

6. The method of claim 5, wherein the determining the filtering vector comprises:
re-adjusting the element values of the filtering vector based on whether a sum of all the element values of the filtering vector is not greater than a second threshold; and
determining the filtering vector to contain the re-adjusted element values as the element values of the filtering vector.

7. The method of claim 5, wherein the adjusting the element values of the filtering vector comprises:
adjusting the element values of the filtering vector that are greater than the preset first threshold to 0; and
adjusting the element values of the filtering vector that are not greater than the preset first threshold to 1.

8. The method of claim 5, wherein the generating the filtering vector comprises:
obtaining a plurality of training images and a plurality of reconstructed images corresponding to the plurality of training images;
combining third distance values between third respective elements of third feature vectors extracted from the plurality of training images and the plurality of reconstructed images corresponding to the plurality of training images, respectively; and
generating the filtering vector to contain the combined third distance values between the third respective elements as the element values of the filtering vector.

9. The method of claim 1, wherein the determining whether there is the anomaly in the first image comprises:
determining a mean square error (MSE) based on the second distance values between the second respective elements of the filtered first and second feature vectors; and
determining whether there is the anomaly in the first image based on whether the MSE is greater than a preset third threshold.

10. The method of claim 4, wherein:
the second image is a reconstructed image that is a same dimension as the first image, and
the first feature vector, the second feature vector and the filtering vector are a same dimension and are determined based on a pixel size of the first image.

11. An electronic device for analyzing an image, the electronic device comprising:
a memory storing one or more instructions; and
at least one processor,
wherein the at least one processor is configured to execute the one or more instructions to:
obtain a first image;
generate a second image by auto-encoding the first image;
extract first and second feature vectors from the first and second images, respectively;
filter each of the first and second feature vectors by using a filtering vector generated based on first distance values between first respective elements of the first and second feature vectors; and
determine whether there is an anomaly in the first image based on second distance values between second respective elements of the filtered first and second feature vectors.

12. The electronic device of claim 11, wherein to generate the second image the at least one processor is further configured to: upon receiving the first image, generate the second image using a first neural network model that reconstructs the first image by encoding the first image and decoding the encoded first image.

13. The electronic device of claim 11, wherein to extract the first and second feature vectors the at least one processor is further configured to upon receiving the first image or the second image, extract the first and second feature vectors by using a second neural network model that outputs feature values determined based on correlations between pixel information of the first image or the second image and a preset sized kernel.

14. The electronic device of claim 11, wherein the at least one processor is further configured to:
determine a filtering vector of same dimension as the first and second feature vectors based on the first distance values between the first respective elements of the first and second feature vectors; and
perform element-wise multiplication of the first and second feature vectors by the filtering vector.

15. The electronic device of claim 14, wherein the at least one processor is further configured to:
generate the filtering vector to contain the first distance values between the first respective elements of the first and second feature vectors as element values of the filtering vector;
adjust the element values of the filtering vector based on whether each of the element values of the filtering vector is greater than a preset first threshold; and
determine the filtering vector to contain the adjusted element values as the element values of the filtering vector.

16. The electronic device of claim 15, wherein the at least one processor is further configured to:
re-adjust the element values of the filtering vector based on whether a sum of all the element values of the filtering vector is not greater than a second threshold; and determine the filtering vector to contain the re-adjusted element values as the element values of the filtering vector.

17. The electronic device of claim 15, wherein the at least one processor is further configured to:
adjust the element values of the filtering vector that are greater than the preset first threshold to 0; and
adjust the element values of the filtering vector that are not greater than the preset first threshold to 1.

18. The electronic device of claim 15, wherein the at least one processor is further configured to:
obtain a plurality of training images and a plurality of reconstructed images corresponding to the plurality of training images;
combine third distance values between third respective elements of third feature vectors extracted from the plurality of training images and the plurality of reconstructed images corresponding to the plurality of training images, respectively; and
generate the filtering vector to contain the combined third distance values between the third respective elements as the element values of the filtering vector.

19. The electronic device of claim 15, wherein the at least one processor is further configured to:
determine a mean square error (MSE) based on the second distance values between the second respective elements of the filtered first and second feature vectors; and
determine whether there is the anomaly in the first image based on whether the MSE is greater than a preset third threshold.

20. A non-transitory computer-readable recording medium comprising one or more instructions for controlling an operation of an electronic device, that when executed by at least one processor of the electronic device, cause the at least one processor to:
obtain a first image;
generate a second image by auto-encoding the first image;
extract first and second feature vectors from the first and second images, respectively;
filter each of the first and second feature vectors by using a filtering vector generated based on first distance values between first respective elements of the first and second feature vectors; and
determine whether there is an anomaly in the first image based on second distance values between second respective elements of the filtered first and second feature vectors.

* * * * *